(12) United States Patent
Hildebrandt et al.

(10) Patent No.: US 8,723,815 B2
(45) Date of Patent: May 13, 2014

(54) INTERACTIVE COMMUNICATION SYSTEMS

(75) Inventors: Peter W. Hildebrandt, Duluth, GA (US); Ian G. Hutchinson, Suwanee, GA (US); James D. Watson, Duluth, GA (US); Michael H. Dunn, Dunwoody, GA (US); Neal A. Hofmann, Atlanta, GA (US); Scott E. Wilson, Kailua-Kona, HI (US); Brent W. Anderson, Portland, OR (US); Louis Ashford, Aloha, OR (US); Richard Meissner, Newberg, OR (US)

(73) Assignee: Steelcase, Inc., Grand Rapids, MI (US)

( * ) Notice: Subject to any disclaimer, the term of this patent is extended or adjusted under 35 U.S.C. 154(b) by 133 days.

(21) Appl. No.: 12/830,924

(22) Filed: Jul. 6, 2010

(65) Prior Publication Data

US 2010/0275132 A1    Oct. 28, 2010

Related U.S. Application Data

(63) Continuation of application No. 11/146,901, filed on Jun. 6, 2005, now Pat. No. 7,750,892.

(60) Provisional application No. 60/577,095, filed on Jun. 4, 2004.

(51) Int. Cl.
*G06F 3/041*     (2006.01)

(52) U.S. Cl.
USPC ............................ 345/173; 341/171; 715/752

(58) Field of Classification Search
CPC ............................... G06F 1/1605; G06F 3/043
USPC ................................... 345/177, 173; 715/752
See application file for complete search history.

(56) References Cited

U.S. PATENT DOCUMENTS

| 3,438,022 A | 4/1969 | Teeg et al. |
| 4,317,956 A | 3/1982 | Torok et al. |

(Continued)

FOREIGN PATENT DOCUMENTS

| DE | 20112088 U1 | 1/2002 |
| JP | 11-034581 | 2/1999 |

(Continued)

OTHER PUBLICATIONS

Invitation to Pay Additional Fees, Annex to form PCT/ISA/206, Communication Relating to the Results of the Partial International Search for related Application No. PCT/US2005/019780 dated Dec. 15, 2005.

(Continued)

*Primary Examiner* — Amare Mengistu
*Assistant Examiner* — Vinh Lam
(74) *Attorney, Agent, or Firm* — Troutman Sanders, LLP; Ryan A. Schneider; Jay R. Anderson

(57) ABSTRACT

The present invention includes interactive communication systems that incorporate several beneficial embodiments including an interactive tray system, an electronic presentation messaging system, an interactive podium, and a key drive system. The interactive tray system enables a single, transferable interactive unit to be fastened to a communication medium, turning into a fully interactive medium. The electronic presentation messaging system enables the e-mailing of presentations and notes to and from components of the interactive communication system. The interactive podium increases conventional podium mobility, enabling both the presenter, and podium, to move and be moved about the room without attention to wired connections. The key drive system replaces the conventional Y-connector of the key drive technology by effectively integrating the key drive in the device, thus only having one connector, and eliminating the need to change connectors from the key drive, to the USB connector, upon software driver loading.

13 Claims, 19 Drawing Sheets

(56) References Cited

U.S. PATENT DOCUMENTS

| | | | |
|---|---|---|---|
| 4,716,542 A | 12/1987 | Peltz et al. | |
| 4,735,469 A | 4/1988 | Liggett | |
| 4,777,329 A | 10/1988 | Mallicoat | |
| 4,782,328 A | 11/1988 | Denlinger | |
| 4,868,550 A | 9/1989 | Sasaki et al. | |
| 5,200,913 A | 4/1993 | Hawkins et al. | |
| 5,241,303 A | 8/1993 | Register et al. | |
| 5,274,362 A | 12/1993 | Potvin | |
| 5,644,737 A | 7/1997 | Tuniman et al. | |
| 5,644,739 A | 7/1997 | Moursund | |
| 5,654,886 A | 8/1997 | Zereski, Jr. et al. | |
| D389,664 S | 1/1998 | Kotkosky | |
| 5,760,323 A | 6/1998 | Romero et al. | |
| 5,850,209 A | 12/1998 | Lemke et al. | |
| 5,910,802 A | 6/1999 | Shields et al. | |
| 5,915,659 A | 6/1999 | Scannell, Jr. | |
| 5,949,414 A * | 9/1999 | Namikata et al. | 715/753 |
| 5,973,667 A | 10/1999 | Kaye | |
| 6,078,323 A | 6/2000 | Gest | |
| 6,130,658 A | 10/2000 | Yamamoto et al. | |
| 6,130,663 A | 10/2000 | Null | |
| 6,246,411 B1 | 6/2001 | Strauss | |
| 6,360,252 B1 | 3/2002 | Rudy et al. | |
| 6,362,440 B1 | 3/2002 | Karidis et al. | |
| 6,424,338 B1 | 7/2002 | Anderson | |
| 6,558,002 B1 | 5/2003 | Miyashita | |
| 6,624,831 B1 | 9/2003 | Shahine et al. | |
| 6,654,785 B1 | 11/2003 | Craig | |
| 6,704,031 B1 | 3/2004 | Kimball et al. | |
| 6,711,241 B1 | 3/2004 | White et al. | |
| 7,248,231 B2 * | 7/2007 | Hurley et al. | 345/2.1 |
| 2001/0026268 A1 | 10/2001 | Ito | |
| 2001/0032151 A1 | 10/2001 | Paul et al. | |
| 2001/0032248 A1 | 10/2001 | Krafchin | |
| 2001/0048464 A1 | 12/2001 | Barnett | |
| 2002/0041271 A1 | 4/2002 | LeKuch et al. | |
| 2002/0056082 A1 | 5/2002 | Hull et al. | |
| 2002/0097567 A1 | 7/2002 | Zodnik et al. | |
| 2002/0099775 A1 | 7/2002 | Gupta et al. | |
| 2002/0099777 A1 | 7/2002 | Gupta et al. | |
| 2002/0140714 A1 | 10/2002 | Hoffman | |
| 2002/0174085 A1 | 11/2002 | Nelson et al. | |
| 2003/0025678 A1 | 2/2003 | Lee et al. | |
| 2003/0051255 A1 | 3/2003 | Bulman et al. | |
| 2003/0097351 A1 | 5/2003 | Rothschild et al. | |
| 2003/0117379 A1 | 6/2003 | Carro | |
| 2003/0128195 A1 | 7/2003 | Banerjee et al. | |
| 2003/0151596 A1 | 8/2003 | Moyne et al. | |
| 2003/0208543 A1 | 11/2003 | Enete et al. | |
| 2003/0234772 A1 * | 12/2003 | Zhang et al. | 345/177 |
| 2004/0002048 A1 | 1/2004 | Thurmaier et al. | |
| 2004/0002049 A1 | 1/2004 | Beavers et al. | |
| 2004/0003097 A1 | 1/2004 | Willis et al. | |
| 2004/0039934 A1 | 2/2004 | Land et al. | |
| 2004/0044532 A1 | 3/2004 | Karstens | |
| 2004/0071453 A1 | 4/2004 | Valderas | |
| 2004/0074264 A1 | 4/2004 | Kung et al. | |
| 2004/0090424 A1 * | 5/2004 | Hurley et al. | 345/169 |
| 2005/0024341 A1 * | 2/2005 | Gillespie et al. | 345/173 |
| 2005/0134523 A1 * | 6/2005 | Challener et al. | 345/1.1 |
| 2005/0192966 A1 * | 9/2005 | Hilbert et al. | 707/10 |

FOREIGN PATENT DOCUMENTS

| | | |
|---|---|---|
| JP | 2001091807 A | 4/2001 |
| JP | 2001-159955 | 6/2001 |
| JP | 2001282061 A | 10/2001 |
| JP | 2004085787 A | 3/2004 |
| WO | 98/37508 | 8/1998 |

OTHER PUBLICATIONS

International Search Report and Written Opinion for related PCT Application No. PCT/US2005019780 dated Mar. 24, 2006.

"Polyvision Breaks Barriers to Electronic Whiteboard Adoption", Retrieved from the Internet, URL: www.polyvision.com/news/press/060403.asp, pp. 1-2, dated Jun. 4, 2003.

"Walk-and Talk Presentation Series Whiteboard" Installation Guide, Retrieved from the Internet, URL: www.polyvision.com/media/support/guides/w_t_install_web.pdf, pp. 1-28, dated Oct. 1, 2003.

Sisko, J. et al., "Polyvision Breaks Barriers to Electronic Whiteboard Adoption with New Product Line, Walk-and-Talk Makes Interactive Whiteboards Easy to Use with Remote Control and PolyKey Technology", Retrieved from the Internet, URL: www.nsba.org/t+12003/press/polyvision.pdf, pp. 1-3, dated Oct. 22, 2003.

EP Communication for related Application No. EP08020514 dated Nov. 2, 2009.

Notice of Reasons for Rejection dated Nov. 17, 2010 issued by the Japanese Patent Office for related Japanese Application No. 2007-515672.

* cited by examiner

INTERACTIVE COMMUNICATION SYSTEMS

CROSS-REFERENCE TO RELATED APPLICATIONS

This application is a continuation and claims the benefit of U.S. patent application Ser. No. 11/146,901, filed 6 Jun. 2005, the entire contents and substance of which are incorporated by reference as if fully set forth below, which claims the benefit under §119(e) of U.S. Provisional Patent Application No. 60/577,095, filed 4 Jun. 2004.

BACKGROUND

1. Field of the Invention

This invention relates generally to the field of tracking systems, and more particularly to electronic interactive communication systems.

2. Description of Related Art

Interactive Tray System

Tracking systems are used so a presenter can control a computer from a remote location. Tracking systems generally include a computer and a presentation surface distant the computer. The tracking system syncs actions at the presentation surface with the computer. When using the tracking system, the presenter can control the computer from a presentation surface. Properly calibrated tracking ensures commands at the presentation surface are properly interpreted by the computer.

The presentation surface of an interactive communication system can be an electronic whiteboard, which can include the familiar dry erase whiteboard, primarily used for meetings and presentations, which saves indicia written on its surface to a computer connected to or embedded in the whiteboard. In the prior art forms, the user writes on the electronic whiteboard surface using dry erase markers, while in others, the user uses a non-marking stylus. The manner of writing on both forms will be referred to collectively as "writes" or "writing." Regardless of the type of instrument used to write on the surface, the electronic whiteboard saves indicia written on its surface in electronic format to a computer via a software program. The user can then print, fax, e-mail, and edit the meeting notes that were written on the whiteboard surface. Just as electronic whiteboards can detect writing on the whiteboard surface, electronic whiteboards also can sense the location of a touch on the whiteboard surface.

Electronic whiteboard surfaces typically incorporate a touch sensitive screen. Touch screens are widely used to present a user with an intuitive pointing interface. For example, touch screens are used in automatic teller machines, scientific and industrial control devices, public kiosks, and hand held computing devices, to name but a few common touch applications. In order to operate, touch screens can use various technologies, including resistive, capacitive, acoustic, infrared, and the like. In most touch screen applications, the touch sensitive surface is permanently mounted on a display device such as a cathode ray tube (CRT), or a liquid crystal display (LCD). Receivers are coupled to processes that can then take appropriate actions in response to the touching and the currently displayed image.

As explained, interactive communication systems can comprise a myriad of technology, ranging from the relatively simplistic blackboard, to the latest technology in interactive plasma systems. Presentation surfaces, as the term is used herein, incorporates this range of technology, including both interactive surfaces and non-interactive surfaces, for example, blackboards, rear projection, pull-down projection screens, walls, flip charts, whiteboards, other electronic display and projection systems, touch screen systems, plasma and flat screen systems, and the like. Interactive surfaces, as the term is used herein, include the familiar electronic whiteboard. Non-interactive surfaces, as the term used herein, includes presentation surfaces that are not interactive by their nature, for instance, blackboards, walls, screens, frames, flip charts, and the like.

Interactive communication systems provide many benefits to users during lectures, meetings, and presentations. During meetings and presentations, not only do interactive communication systems allow presenters to address topics in front of a large audience, for example, by writing on a blackboard and using a pull-down projection screen, but more advanced interactive communication systems permit handwritten notes on a board to be saved electronically for future reference and manipulation.

By saving the indicia written on a whiteboard to a computer so that the writings can be printed out or e-mailed to others, the whiteboard provides an accurate record of the meeting or presentation. This feature of interactive communication systems allows those present to focus on the meeting, not on note taking. Also, because an electronic whiteboard can sense the location of a touch, the connected computer can be controlled by touching buttons belonging to the graphical user interface in the display image. This allows the user to control the flow of the meeting without leaving the front of the room.

In the classroom setting, interactive communication systems comprising electronic whiteboards are particularly advantageous as they provide educators with a modern and user-friendly teaching tool. Educators prefer electronic whiteboards because of their versatility. Electronic whiteboards allow educators to project text and/or images onto the whiteboard, as well as write along side of projected images and markup projected images with electronic ink.

By displaying the computer image onto the presentation surface of the interactive communication system, the educator has the ability to operate the computer while standing at the system using an instrument, e.g. a stylus or finger, or can roam freely about the room and operate the computer using a remote control touch pad and buttons.

Conventional interactive communication systems, however, do have disadvantages. They are usually limited to projecting devices projecting a display image upon the presentation surface, wherein the presentation surface comprises a tracking system. For instance, an interactive communication system can comprise an electronic whiteboard and a projecting device. Alternatively, the tracking system and display image are combined in a unitary device, which results in a bulky combination. An interactive communication system comprising a tracking system conveniently attachable to a presentation surface, or a flat display surface, is a much needed improvement over prior art.

A device capable of providing interactivity to a non-interactive surface is also needed. The ability to transform a large-scale plasma or liquid crystal display (LCD) into an interactive communication system would be a beneficial improvement over the art. By attaching an easy-to-install interactive device to the outer rim of a non-interactive presentation surface, like a flat plasma or LCD surface, and by using a stylus or remote control, the ability to access files, run applications, highlight key points, and capture new thoughts using a plasma or LCD device would be possible.

It would be beneficial to provide a single, transferable interactive device, or tray, that can be fastened to a non-interactive presentation surface, turning the system into an interactive one. For example, such an easy-to-install interactive tray would provide a chalkboard, flip chart, or plasma screen, with the capability of interactivity. The tray, or device, can comprise a sensor system and a tracking system.

Electronic Presentation Messaging System

Messaging systems are used to send and receive messages from a first location to a second location. A typical messaging system is electronic mail, commonly referred to as e-mail. E-mail is a method of sending messages electronically via computer systems or networks. E-mail includes text or graphic messages; additionally, e-mail can carry attached files, e.g. data, presentations, documents, and the like, in transmission.

Conventionally, when one conducts a presentation, for example in Microsoft PowerPoint® and the like, the presentation is loaded onto a computer, and then run. The presentation can be placed on a website or server accessible by the computer attached to the interactive communication system, such an electronic whiteboard or projecting device. The computer must then download or access the file via the web or server. Thus, as a result, a computer or laptop must be connected to the interactive communication system.

In an alternative situation, the presenter can transfer a memory device, e.g. diskette or CD-ROM, or laptop containing the presenting material to the location containing the interactive communication system. The presenter then either inserts the diskette into an attached computer or connects the laptop to the interactive communication system. In either situation, the presenter must have a computer attached to the interactive communication system to be able to present the material.

In many situations, it would be beneficial to eliminate the requirement that the presenter tote along a computer to every lecture, and then the computer connected to the whiteboard or other system for operability. There is thus a need in the art for an improved messaging system to permit an electronic presentation to be sent to a lecture facility without the need of carrying a computer. E-mailing the presentation to the lecture would be advantageous.

Additionally, there are no current solutions of e-mailing a presentation from an interactive communication system to a remote location. Conventional systems only permit one to save, print or connect to a website to save the presentation.

Consequently, there is a need in the art for the ability to e-mail presentations to and from an interactive communication system.

Interactive Podium

In general, podiums are generally used to assist presenters in their presentation. Traditionally, podiums are raised platforms that can aid as a speaker stand. They were often difficult to move and only held the notes of the presenter. Over time, however, the podiums have improved from being a static stand, simply holding papers, to becoming a dynamic stand, allowing electronic interaction.

An interactive podium is a dynamic stand that allows the presenter to interact with the presentation surface. For instance, an interactive podium can include a touch screen that projects the same image shown upon the presentation surface. The presenter can touch the touch screen of the interactive podium, whereby through calibration sequencing, the touch is replicated on the presentation surface at the same location as the touch on the podium. Like the interactive communication system, described earlier, the indicia from the touching of the interactive podium can be saved, printed, or e-mailed, thereby capturing the new indicia created from the presentation.

Additionally, the interactive podium can be attached to a processing computer creating a connection with a presentation surface. The computer creates an image that is displayed on the display device, commonly a monitor, of the interactive podium and then the displayed on the presentation surface. The computer, likewise, can save the indicia created during the presentation. Again, the presenter has the option to save, e-mail, print, or delete the indicia.

Currently, interactive podiums are generally not mobile, as they must be restricted to an area in or around an electrical outlet. This limits the ability of freely moving the interactive podium about a room, unless the podium is moved only to areas within the length of an electrical extension cord. Since the presenter may want to roam around a room while presenting, this limits the range the presenter may roam. There is a need in the art for a cordless interactive podium, capable of being moved, easily, from one location to another, before, during and after a presentation.

Further, it would be beneficial to increase podium mobility, enabling both the presenter, and podium, to move and be moved about the room without attention to wired connections.

Method and System of Loading Software—Key Drive System

Loading software, or more specifically software drivers, is a complicated and often burdensome process. Usually, this process requires a significant amount of time to be completed properly. Unfortunately, the process also requires a host of software, e.g. diskettes or CD-ROMs. The typical method is to install the new software drivers on the computer to run the device.

When loading the software drivers, which may include one or more diskettes, the order of inserting the diskettes is critical. Also, the manner of keeping the diskettes handy, should something happen to the hard drive, is mandatory. Thus, what is needed is an easy and straight-forward method of loading software drivers, and software, without the need of diskettes.

SUMMARY

The present invention comprises novel and non-obvious interactive communication systems that incorporate several beneficial embodiments that improve upon existing technologies. Briefly described, the present invention comprises an interactive tray system, an electronic presentation messaging system, an interactive podium, and a key drive system.

Interactive Tray System

The present invention is a device capable of enabling a non-interactive presentation surface to be used in an interactive communication system, for example, enabling a plasma or liquid crystal display (LCD) screen to be used interactively. Further, the present invention comprises a new and useful interactive communication system, incorporating an interactive tray system and a non-interactive presentation surface.

Currently, most interactive communication systems that transform a flat-panel display in an interactive setting require completely enclosing the flat panel display with a bulky frame and various mechanisms. Yet, such systems deter from the look of a plasma or LCD screen. Also, speakers usually fastened to the side of the display do not work with these systems, as the framing necessary requires the removal of the speakers. As the user beneficially would like a tray to hold the stylus used with the interactive system, the units can get even larger.

The present interactive tray system preferably places the entirety of the interactivity of the system into a stylus tray, providing a single item that can be fastened onto a portion of a single edge of the flat-panel display, preferably centered on the bottom edge. By implementing the interactivity of the system in a single device, the necessity of an all-edge, wrap-around interactive communication system design, which is used currently, is obsolete.

In addition, the portable nature of the present interactive tray system, due mainly to its small size and easy fastening, enables it to be attached to a variety of display types, including flip charts, projections screens, and others.

The interactive tray system comprises a sensor system. The sensor system senses the position of a stylus in proximity to the non-interactive surface. As a result, the sensor system can create location data of the stylus. The location data can be communicated to a tracking system that can sync the movement of the stylus with a computer.

The interactive tray system can further comprise a ventilation system. Typically, the ventilation system is used to reduce the temperature in proximity of the presentation surface, which can include cooling the tray and/or the presentation surface. As the tray system can be attached to a plasma screen, and since plasma screens can operate at relatively high temperatures, a fan can be used to cool the presentation surface. Additionally, the ventilation system can reduce the amount of dust particles that can fall into the tray system, as it beneficially is located at the bottom of the presentation surface. By reducing, or effectively eliminating, the amount of dust particles in the tray system, the tray system can be more efficient and last much longer. Cooling the screen can also limit potentially interfering energies that can adversely effect the sensor system.

The tray system can further comprise a shielding system to shield the sensor system from interference. For example, the shielding system can reduce the amount of light on a set of infra-red sensors of the sensor system. The shielding system can restrict the visibility of the field of view of the sensors, thus reducing the external light interference.

Electronic Presentation Messaging System

The present invention comprises an electronic presentation messaging system that enables presentations and notes to be transmitted to and from an interactive communication system. As used herein, a "presentation" is defined as the work to be presented without annotation, and "notes" are defined as the annotation of the presentation. For example, a user might prepare and present a PowerPoint® series ("presentation"), and during the course of the series, attendees and the user might interactively annotate the series (with "notes").

With current systems, after a meeting, the results of the interactive presentation can be retrieved from the computer. Similarly, the presentation can be brought to the meeting via the computer. Such action requires the user to manually haul the computer or laptop back and forth for presentation preparation or explicitly retrieve material from a web server over the LAN.

It would be beneficial if a user could create a presentation at one work place, e.g. preferably, the user's personal work space, and e-mail it to the interactive communication system in a presentation location, e.g., a meeting room. That way, when the user enters the meeting room, he/she can simply press a button in proximity to or attached to the interactive communication device, and the e-mailed presentation is ready for use. In the same way, after the presentation is complete, the system can e-mail the presentation and notes to the attendees of the meetings, either by pushing a button or ending the presentation. Thus attendees can retreat back to their personal work stations, and have easy access via e-mail of the presentation.

The present e-mail system is preferably integrated in interactive communication systems, and preferably in electronic whiteboard systems.

Interactive Podium

The present invention further comprises an interactive podium, including a remote control system, and a mobile power system. Today, there are a number of manufacturers that make interactive liquid crystal display (LCD) screens for podium use. Generally, these interactive LCD panels are used with the same image projected on a pull-down screen so that an audience can see what is being written. These systems work well, but a significant problem is that many have floating toolbars (containing annotation tools, erasers, highlighters, and the like) displayed on the screen. Unfortunately, the audience can see these toolbars that usually detract from the presentation.

Further, the toolbars can become an inconvenience when the data that needs to be annotated resides beneath the toolbar. The toolbars must be moved in order to allow annotation. Although the podium allows the presenter to face the audience, it currently does not allow him/her to move about the room and interact with the audience while still marking up the display.

One manufacturer has worked around the floating toolbar by providing a series of hard buttons around the periphery of the interactive LCD panel. This, however, still does not allow for mobility in the room.

The present invention provides a mobility system for an interactive podium comprising a remote control system, the remote control system including a remote control for the interactive podium screen that provides annotation capability and mode changing buttons. The remote can include a touch pad for easy markup of the display, creating notes on the presentation, from anywhere in the room. A remote control receiver can be connected to the interactive podium screen. Such a remote control can provide more mobility around the room, and the removal of on-screen toolbars from the display.

Another problem with the interactive podiums available today is the requirement that the podiums need cables for video and power and in some cases a local area network (LAN) connection. Conventional interactive podium technology has the computer on the podium, providing the projector with video via a wireless connection, or the computer can be located distant the podium, effectively providing wireless mouse control.

In many situations, the podium and its components are simply not in the right place in the presentation room, and the hard-wiring requirements makes it difficult, if not impossible, to move the podium. In modern classrooms, for instance, professors often rearrange the space for group work or teams, and this is not practical with the hard-wired podium.

The present invention provides an interactive podium comprising a mobile power system that frees the system from hard-wiring to a specific location in the room. The power system can include a battery sufficiently powerful to run the system for a convenient amount of time. Further, the system can include a wheeled podium, and a wireless link (wireless LAN/video) for further mobility ease, so that, for example, the computer or a printer need not reside on the podium itself. Video to the projector can be delivered wirelessly, for example, via a wireless standard, such as IEEE 802.11 or Bluetooth.

Method and System of Loading Software—Key Drive System

The present invention further comprises a key drive integration system. A key drive, preferably a disk-on-a-chip flash memory storage device, presently provides the drivers necessary for a presentation, so the presenter need not search for a CD-ROM to load the drivers on the system. Instead, the key drive is simply inserted into the computer, and it installs the driver.

In the present invention, a Y-connector comprises the key drive system. A method of loading software is simplified by this system. Since the key drive is on one of the two arms of the Y-connector, the method of loading drivers is straightforward.

For instance, this system allows the user to instantly begin using a interactive communication system, preferably an electronic whiteboard, without pre-loading special software. This instant access is accomplished with the key drive. Preferably, the key drive is a disk-on-a-chip flash memory storage device, for instant plug-and-play. The key drive, which is attached to the Y-connector cable, plugs into a computer to connect the interactive communication system, eliminating the need for storing system software, say in a desk drawer. In essence, the key drive replaces special application software (usually provided by CD-ROM) required in other interactive systems on the market. The typical interactive communication system runs on drivers, much like a printer, allowing anyone to instantly begin using the interactive communication system. By using the key drive technology, users can connect the interactive system to the computer immediately, eliminating the need to plan ahead.

The key drive can be physically attached to one end of a standard USB cable, forming a "Y" on one end. For example, to install interactive communication system software on the computer, one simply connects the key drive (on the USB cable) to the computer's USB port. When software installation is complete, the USB key drive is disconnected, and the straight USB cable is connected in it place. The opposite end, or leg of the "Y," can be concurrently connected to the interactive communication system.

Other advantages and aspects of the present invention can be understood from the appended drawings and accompanying description.

DETAILED DESCRIPTION

Figure 1:
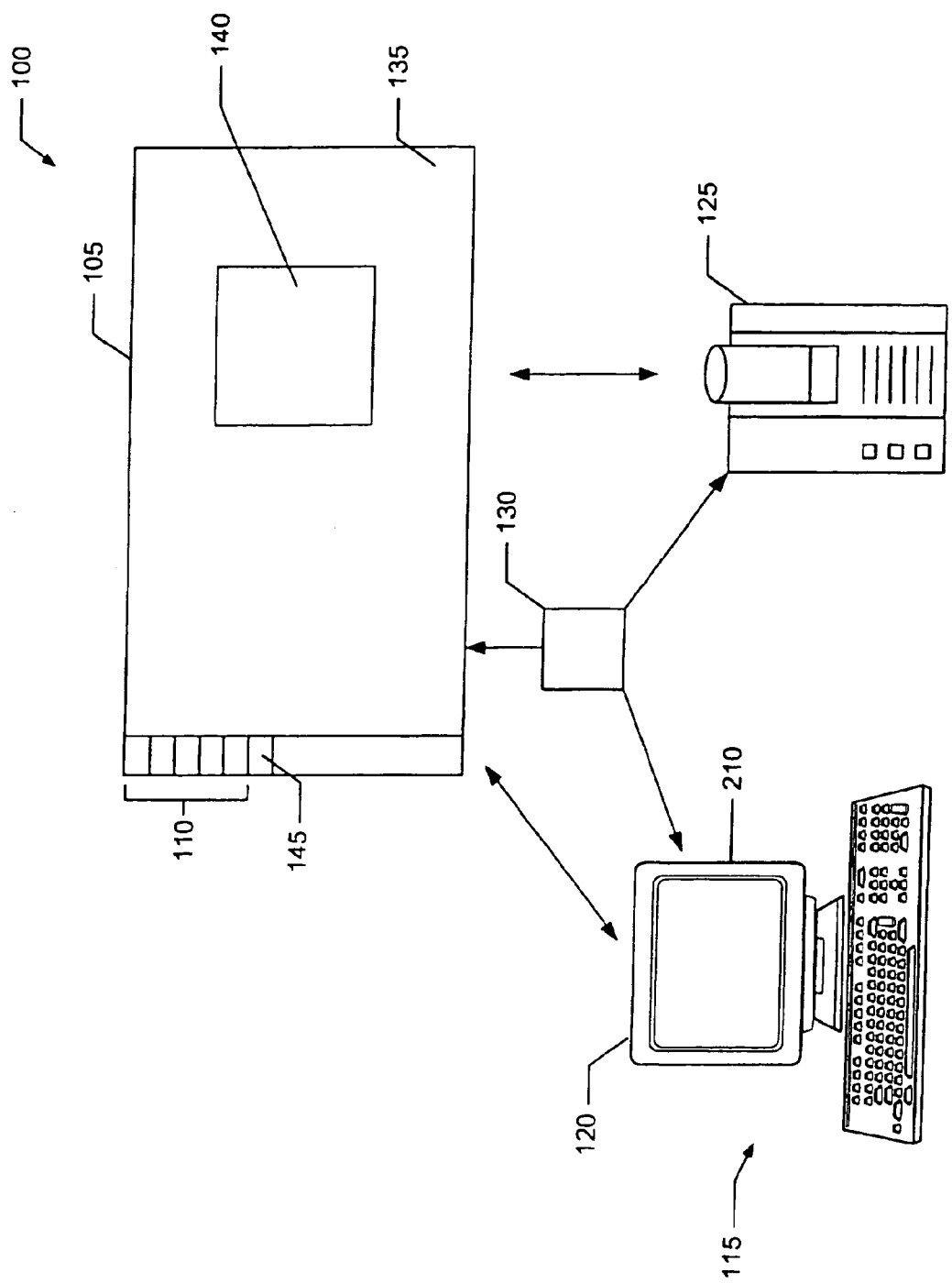
FIG. 1 depicts an exemplary interactive communication system.

Referring now to the above figures, wherein like reference numerals represent like parts throughout the several views, the present interactive communication systems will be described in detail. The present invention comprises an interactive tray system, an electronic presentation messaging system, an interactive podium, and a key drive system.

Example of Interactive Communication System

FIG. 1 depicts an exemplary interactive communication system, being an electronic whiteboard system 100 of the present invention. As discussed previously, the interactive communication systems of the present invention can include various systems beyond whiteboard technology, including interactive systems with LCDs, tablets, other electronic display and projection systems, touch screen systems, plasma and flat screen systems, and the like. The electronic whiteboard system 100 is presented as an example of such interactive technology, and does not limit the scope of the present invention.

The electronic whiteboard system 100 includes an electronic whiteboard 105 operatively connected to a processing device 115. Processing device 115 can be an integrated component of the electronic whiteboard 105, or processing device 115 can be an external component. Suitable processing devices include computing devices such as personal computers.

Electronic whiteboards 105 are known in the art and can receive input from a user in a variety of ways. For example, electronic whiteboards 105 can incorporate capacitance technology and receive input from a user via an electrically conductive stylus (not shown). The stylus can be a writing instrument, including a finger. An exemplary stylus can transmit a signal to electronic whiteboard 105 indicating the location of the stylus in relation to a surface of electronic whiteboard 105. The stylus can also transmit other information to electronic whiteboard 105 including but not limited to pen color, draw or erase mode, line width, font or other formatting information.

In another embodiment, electronic whiteboard 105 can be touch sensitive or pressure sensitive. Touch sensitive or pressure sensitive means having the capability to convert a physical contact into an electrical signal or input. Touch sensitive electronic whiteboards can incorporate resistive membrane technology. See for example U.S. Pat. No. 5,790,114 to Geaghan et al. describing resistive membrane electronic whiteboards, and which patent is incorporated herein in its entirety.

In one embodiment, electronic whiteboard 105 has two conductive sheets physically separated from one another, for example by tension, such that the two sheets contact each other in response to a touch or physical pressure. The sheets are made of a conductive material or can be coated with a conductive material such as a conductive film, and can be deformable. Touching, writing, or other application of pressure on the surface of the conductive sheets causes contact between the two conductive sheets resulting in a detectable change in voltage or resistance. The sheets can act as resistance dividers and a voltage gradient can be created by applying different voltages at the edges of a sheet. The change in voltage or resistance can then be correlated to a location value, for example a Cartesian coordinate set. Coordinate data, for example (x,y) pairs or their equivalent, can be transmitted to processing device 115 in compatible data packets, for processing, manipulating, editing, or storing.

Other embodiments for an electronic whiteboard 105 include laser-tracking, electromagnetic, infrared, camera-based systems, and so forth. These systems detect the presence of ink markings or a pointer or stylus device across a two-dimensional surface, which can be enabled for erasure of marks made with a dry-erase maker, but do not have to be.

Conventional dry-erase markers are typically used to write on a surface of electronic whiteboard 105, but other erasable or removable ink, pigment, or coloring can be used to physically mark a surface of electronic whiteboard 105. The physical markings on electronic whiteboard 105 can be removed using conventional methods including an eraser, towel, tissue, hand, or other object that physically removes the markings from the surface of electronic whiteboard 105.

Electronic whiteboard 105 can also include a control area 110. Control area 110 can contain multiple control areas 145 (for example a button or a soft key) for controlling a function of the electronic whiteboard system 100. Control area 110 can be an actuator, for example a physical button 145, that can be actuated by applying pressure to control area 110. The function of control area 110 can be fixed or variable. If the function of control area 110 is variable, control area 110 can comprise a soft key 145 whose function can be controlled by processing device 115. For example, soft key 145 can have different functions depending on different application software running on processing device 115. An image or icon can be projected near control area 110 indicating the current function of a soft key 145 using a projecting device 125.

Projecting device 125 can be operatively connected to processing device 115, whiteboard 105, or both. Projecting device 125 can be a conventional projecting device for projecting a display image 140, e.g. a graphical user interface, typically on a display 120 of the processing device 115 onto a surface 135 of the electronic whiteboard 105. Projecting device 125 can adjust for image distortions including keystoning and other optical problems, for example optical problems arising from the alignment of a projected image on surface 135 with the graphical user interface on display 120. Alternatively, processing device 115 can adjust for image or alignment problems. A user can also physically adjust projecting device 125 to compensate for image problems including keystoning.

Another embodiment of the present invention includes a plasma display or rear-projection system with a coordinate-detecting surface, such as a touch-sensitive, capacitive, camera-based, laser-tracking, electromagnetic, or others, whereby a stylus can be tracked on the surface and the video source is provided by the processing device 115. Laser-tracking technology can require specially coded pens or styluses. Laser-tracking technology utilize optical tracking interfaces using infrared lasers that track these specially coded pens or styluses as they move across the board. Regardless of the projection screen used, those present can view everything drawn on the projection screen, while the processing device captures what is drawn on the screen. Examples of laser tracking electronic whiteboards include the Webster™ Laser Tracking (LT) Series of interactive whiteboards manufactured by PolyVision Corporation. LT technology can require specially coded pens or styluses. LT technology utilize optical tracking interfaces using infrared lasers that track specially coded pens or styluses as they move across the presentation surface. Regardless of the presentation surface used, those present can view everything drawn on the presentation surface, while the processing device captures what is drawn on the screen. Other electronic whiteboard technologies include ultrasonic pen tracking, infrared pen tracking, electromagnetic pen tracking, and others.

Electronic whiteboard system 100 can also include remote control device 130 that can be in communication with the electronic whiteboard system 100, or a component thereof. For example, remote control device 130 can be in communication with electronic whiteboard 105, processing device 115, projecting device 125, or a combination thereof. Communication between remote control device 130 and another component of the system 100 can be by electromagnetic technology, including, but not limited to, infrared or laser technology. Additionally, communication between remote control device 130 and electronic whiteboard system 100 can be by conventional wireless, radio, or satellite technology.

Interactive Tray System

The present invention is a device capable of providing interactivity to a non-interactive presentation surface. Currently, most interactive communication systems for flat-panel displays require completely enclosing the flat panel display with a bulky frame and various mechanisms, for example, corner camera arrangements. The tray system of the present invention elimates the disadvantages of the conventional framing, and beneficially provides a tray to hold the stylus used with the interactive system.

Figure 2:
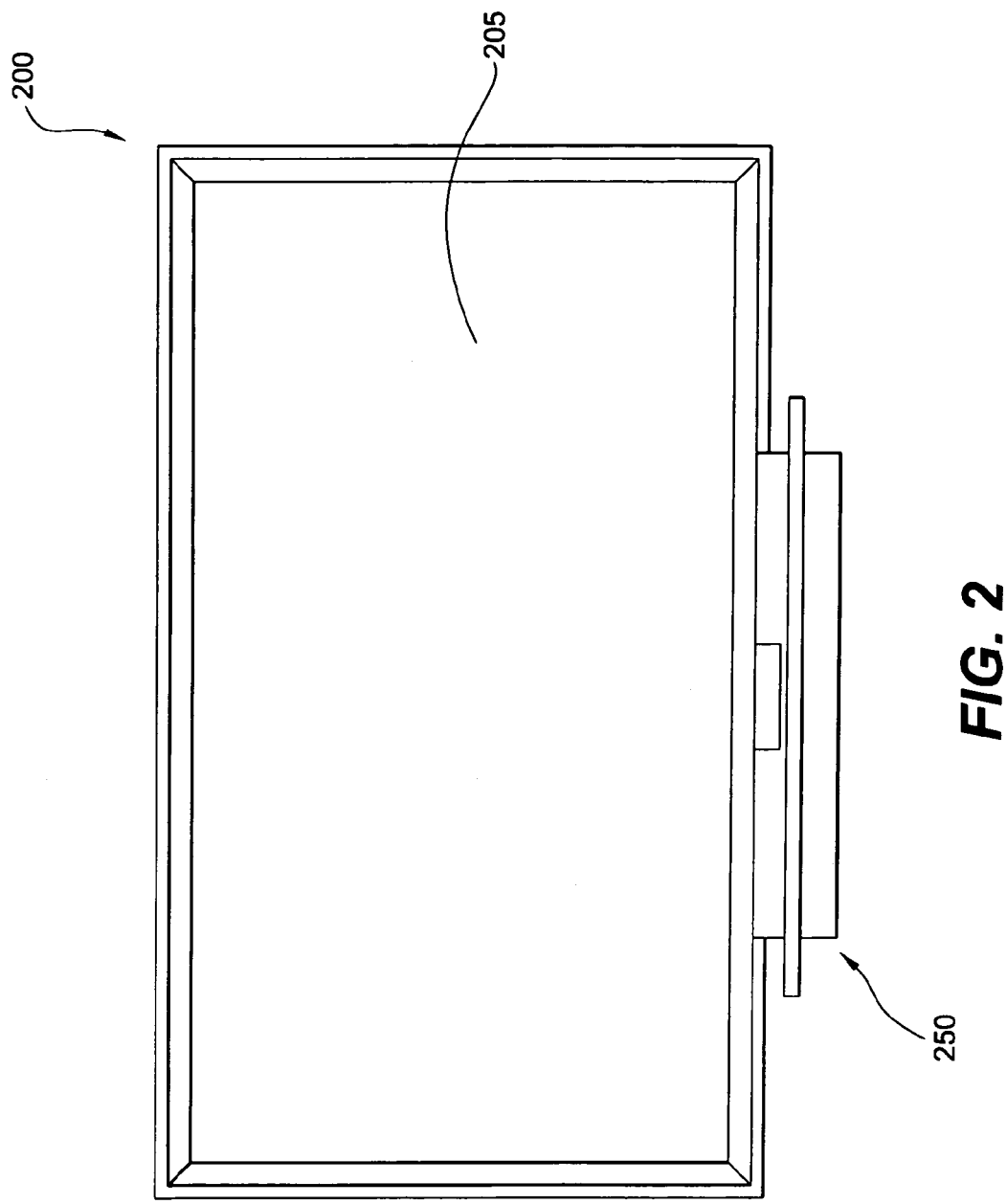
FIG. 2 depicts a front view of an embodiment of the interactive communication system.
Figure 3:
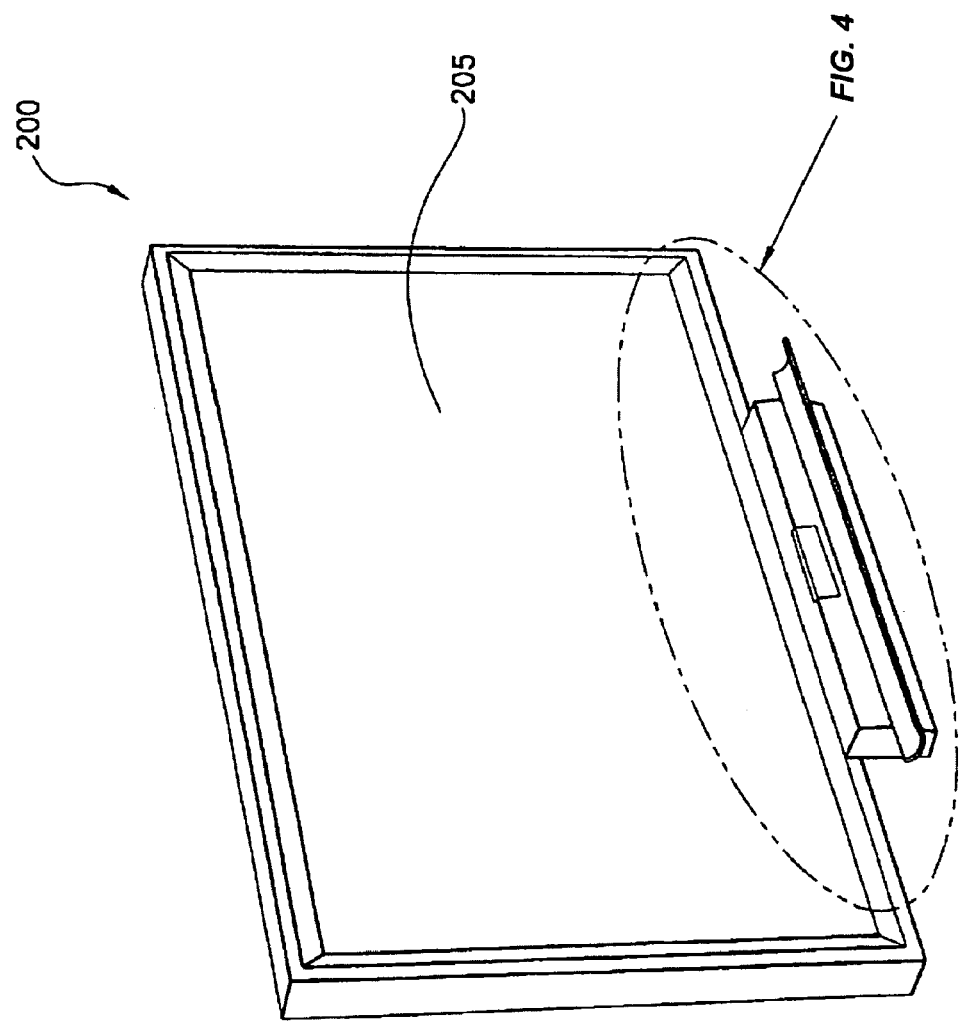
FIG. 3 depicts a front perspective view of an embodiment of the interactive communication system.
Figure 4:
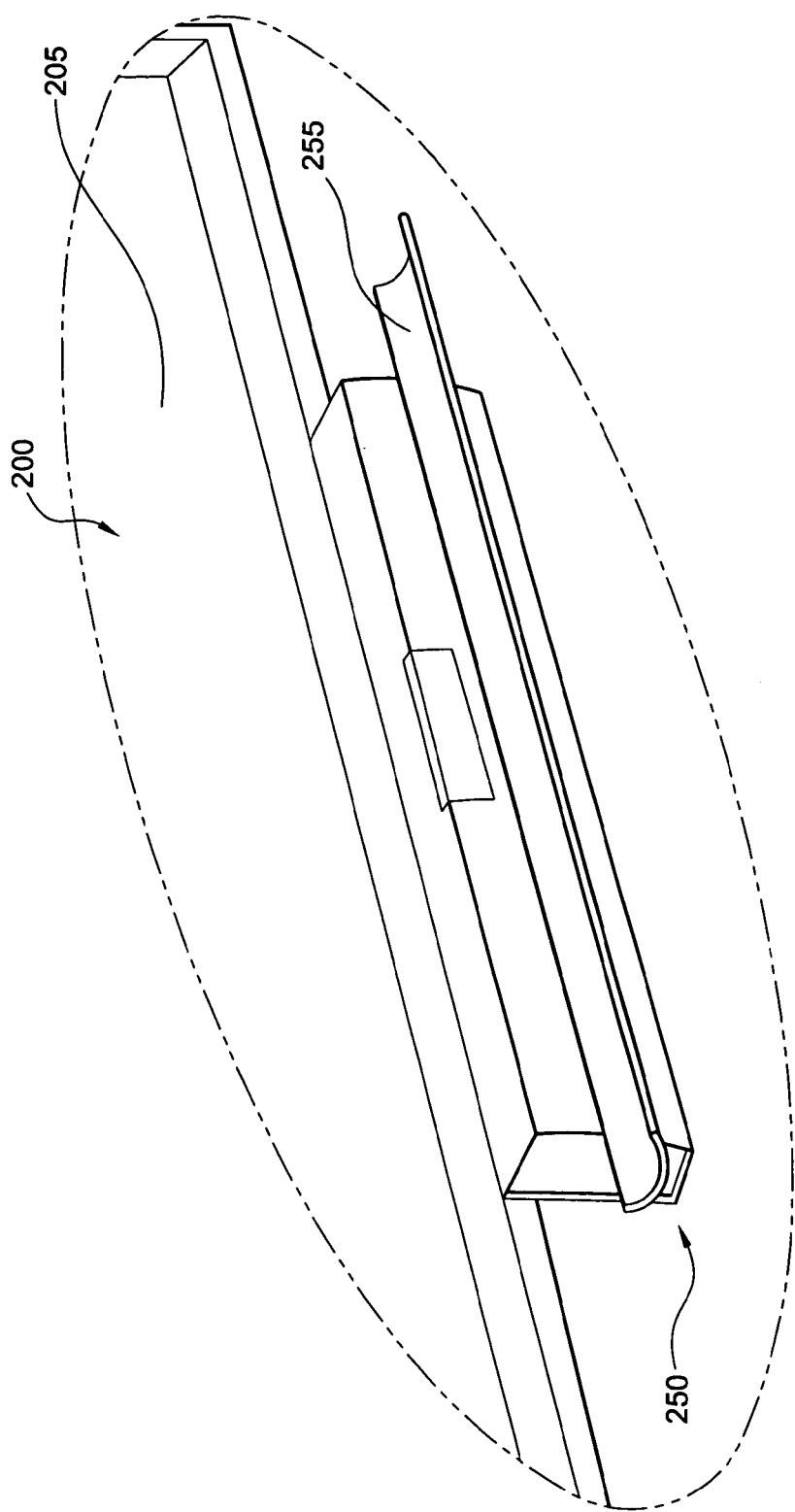
FIG. 4 depicts a close-up view of a portion of the embodiment of the interactive tray system of FIG. 3 attached to a flat screen.
Figure 5:
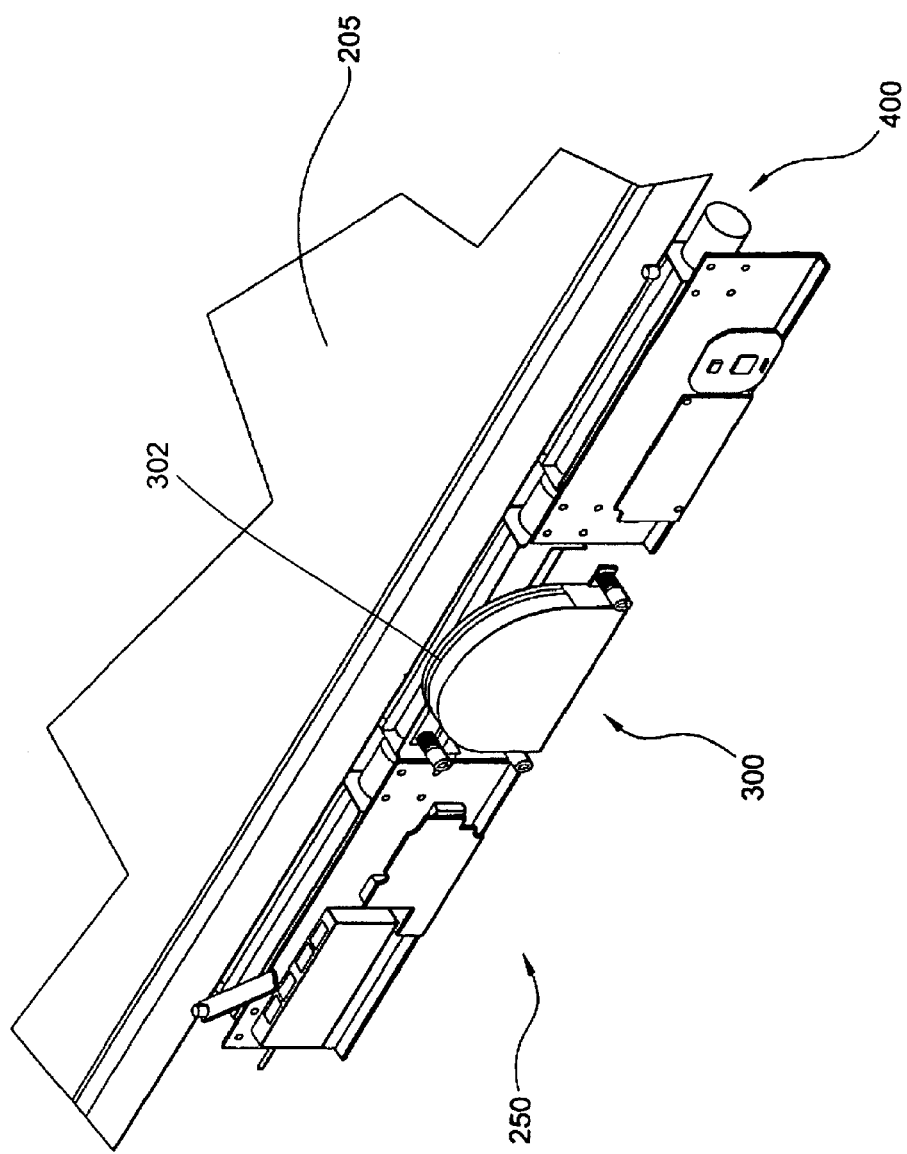
FIG. 5 depicts a view of an embodiment of the interactive tray system.
Figure 6:
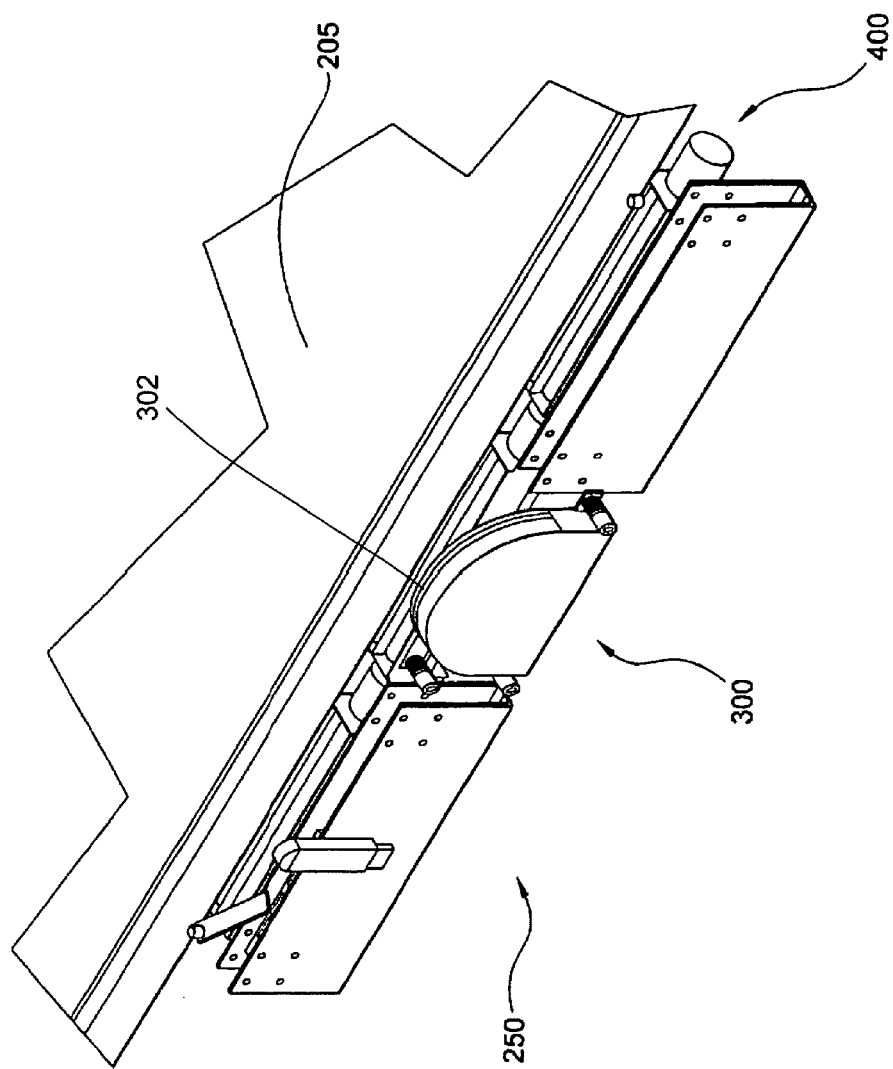
FIG. 6 depicts a view of an embodiment of the interactive tray system
Figure 7:
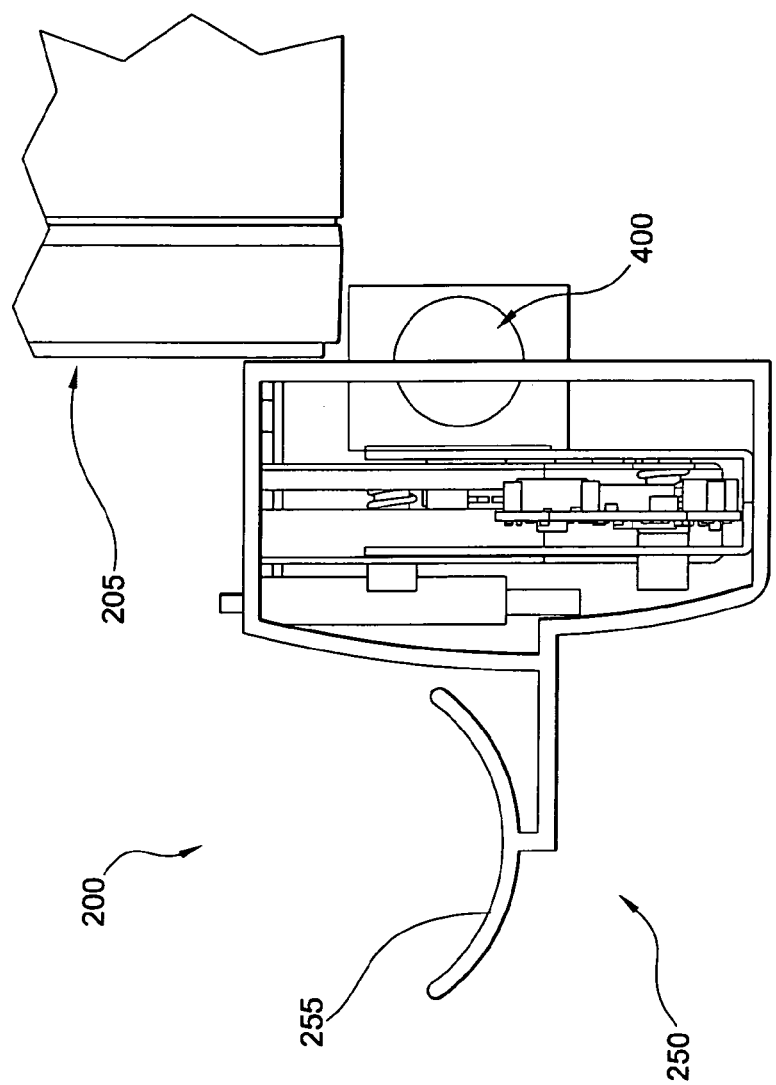
FIG. 7 illustrates a cross-sectional end view of the interactive tray system.

FIGS. 2-4 illustrate an embodiment of the present invention. In these figures, an interactive communication system 200 is shown. Interactive communication system 200 can comprise a presentation surface 205. The presentation surface 205 is typically a non-interactive presentation surface.

Typically, presentation surfaces are rectangular in design, having a top, bottom and two sides. As one skilled in the art will appreciate, presentation surfaces can be other shapes and designs, such as triangular, circular, polygonal, and the like.

It is known to provide interactivity to the standard plasma or LCD screen. Such interactivity can include tracking technology comprising laser technology, camera-based systems, or light emitting diodes (LEDs), in order to track the inputs on the presentation surface.

Conventionally, the entire presentation surface is wrapped with a frame for the interactivity, and a tray placed at the bottom of the presentation surface holds a plurality of styli. The frame can be much larger than the presentation surface, in order to implement the tracking technology. Unfortunately, the frame can be quite expensive, unwieldy, and must be designed uniquely for each presentation surface. Indeed, the camera-based systems typically include a sheet of glass or Plexiglas® in front of the display. Some presentation surface manufacturers place controls that must be reached at varied locations around the presentation surface, and speakers can be located in numerous locations, and ventilation in different areas, so each frame must be individually crafted depending on the type of presentation surface. Further, such framing will interfere with speaker placement as well.

As shown in FIGS. 2-4, the present interactive tray system 200 places the entirety of the interactivity of the system into the interactive tray system 250, providing a single item that can be fastened onto the presentation surface 205, removing the necessity of the entire wrap-around designs used currently. This system creates the interactive communication system 200 from the presentation surface 205, and the interactive tray system 250. Typically, the tray 250 can be placed at the bottom of the presentation surface 205.

The present invention comprises the interactive tray system 250 that does away with the bulky framing of presentation surfaces, and avoids compromising the speaker system and control system of the presentation surface 205 by removing the framing that can typically interfere with such systems. The present interactive tray system 250 eliminates the wrapping of the presentation surface 205, and can be used in standard presentation surfaces. A single tray system 250 can be used with various size presentation surfaces, various manufacturers, various kind of displays—LCD, plasma, and the like.

The tray system 250 includes a sensor system adapted to sense an instrument in proximity to the non-interactive presentation surface 205. Further, the sensor system has the ability to communicate with a tracking system. The sensor system, preferably, can comprise a plurality of infrared sensors. In a preferred embodiment, the sensor system used in the tray system 250 is manufactured by MIMIO by Virtual Ink, which uses a high-resolution ultrasonic position capture system. Additionally, the sensor system can use triangulation techniques to obtain location data of the instrument in proximity to the presentation surface 205. The sensor system can provide location data of the instrument in proximity to the presentation surface 205. Preferably, the sensor system is not a camera-based system, which utilizes cameras to perform sensing functions.

Tracking systems are used so a presenter can control a computer from a remote location. Tracking systems generally include a computer and a presentation surface distant the computer. The tracking system syncs actions at the presentation surface with the computer. When using the tracking system, the presenter can control the computer from the presentation surface. Properly calibrated tracking ensures commands at the presentation surface are properly interpreted by the computer, or processing device.

A tracking system enables a user of the interactive tray system 250 to control a computer from the presentation surface 205. The tracking system communicates with the sensor system to identify an instrument in proximity to the non-interactive presentation surface 205. The tracking system can then communicate the related location data obtained from the sensor system to the computer to coordinate the computer to the presentation surface.

The present invention integrates the interactivity of the system into the tray system 250. Integrating the interactive system in the tray 250 makes the design much slimmer and can be applied to many models much more cheaply; thereby improving the aesthetics of the system and greatly reducing the number and size of parts required to provide the presentation surfaces with interactivity. Additionally, the tray 250 can be transferred easily from one presentation surface to another.

The present tray system 250 can clamp on the bottom edge of the presentation surface 205, and provides the required triangulation, preferably using a combination of ultrasonic and infrared, to triangulate the position of a writing/erasing instrument in proximity to the surface 205 or of touches. While such ultrasonic and infrared tracking systems are known, these conventional systems are placed on the sides or tops of presentation surfaces for a variety of reasons, all of which have been overcome by the present interactive tray system 250, enabling it to be placed at the bottom of the presentation surface 205.

Some difficulties with ultrasonic and infrared technologies when used with such systems include that if the tracking system is on the bottom of the tray in a conventional system, the hand of the presenter can get in the way of the tracking. Further, dust can fall into such a bottom-positioned tray, which hampers the sensors. Additionally, the conventional system is awash in background heat and infrared radiation, which interferes with the conventional tracking system, and has heretofore made such an interactive tray located at the bottom of the panel nearly impossible.

Background infrared is picked up by the conventional interactive system facing the lights of the room, and the radiation emitted by the presentation surface. While plasma screens indeed generate a lot of heat (which heat can create "sound wave mirages" that affect the accuracy of ultrasonic detection), they also generate a tremendous amount of infrared. Consequently, tracking systems that use infrared sensors are disadvantageously affected by the large amounts of infrared coming from the presentation surface. The surface-produced infrared can overwhelm the infrared receivers in the tracking system seeking to identify the relative small amount of infrared used by the tracking system.

FIGS. 5-9 illustrate details of the interactive tray system 250. The present interactive tray system 250 comprises novel and non-obvious techniques to overcome the above problems, by providing a shielding system 300 and ventilation system 400. The shielding system 300 is a method for restricting light on infrared receivers. The ventilation system 400 is a method of both cooling the presentation surface to help with the problems associated with heat. Further, the ventilation system 400 is a method of reducing dust and the problems related to such dust collection.

The present interactive tray system 250 comprises shielding techniques to effectively exclude the infrared emitting from the presentation surface 205 to the sensor system, so the present system is better immune to both the heat of the presentation surface 205 (with the ventilation system 400), and the infrared of the presentation surface 205 (with the shielding system 300).

The present interactive system utilizes the shielding system 300 to restrict the visibility of the field of view of the sensors, so that the primary area it can see is the infrared from the tracking system, not the presentation surface or the room lights. The shielding system 300 further reduces interference on the sensor system.

The present system can overcome the tracking interference by utilizing a specialized stylus (not shown) so that fingers do not get too close to the presentation surface 205, and the user is not tempted to put a hand or elbow on the presentation surface 205.

The shielding system 300 can include a combination of a stack of one or more slits 302 that are of a controlled width, and a controlled distance from an infrared photo diode. The orientation and number of slits can precisely control the plane in which the sensor fields. The slits can be laser cut for accuracy.

The shielding system 300 of the present invention can be applied to a number of non-interactive surfaces beyond that of flat screen systems, including whiteboard technology, rear projection, pull-down projections screens, walls, flip charts, paper, and others.

To overcome the dust problem, the interactive tray system 250 comprises the ventilation system 400, including a fan, which does two main things. First, the ventilation system 400 eliminates dust from falling and settling into the tray 250. Second, the ventilation system 400 cools an element of the interactive communication system, preferably the presentation surface 205. Plasma displays, particularly, tend to produce a large amount of heat. Disappointingly, the industry has not been able to overcome the heat issues with such presentation surfaces. Just as occurs across the floor of a hot desert, heat waves radiate from the presentation surface 205. The heat, from the presentation surface 205, can cause the system trouble in determining the status of stylus through ultrasonic detection. The integration of a fan in the ventilation system 400 with the present tray 250 helps eliminate the heat from the presentation surface 205; thus, providing a cleaner picture to the attendees. The ventilation system 400, preferably, blows a stream of air up and over the presentation surface. As a result, the fan pulls air from the back of the presentation surface. Consequently, the presentation surface 205 is cooled by the air blown across it.

Figure 8:
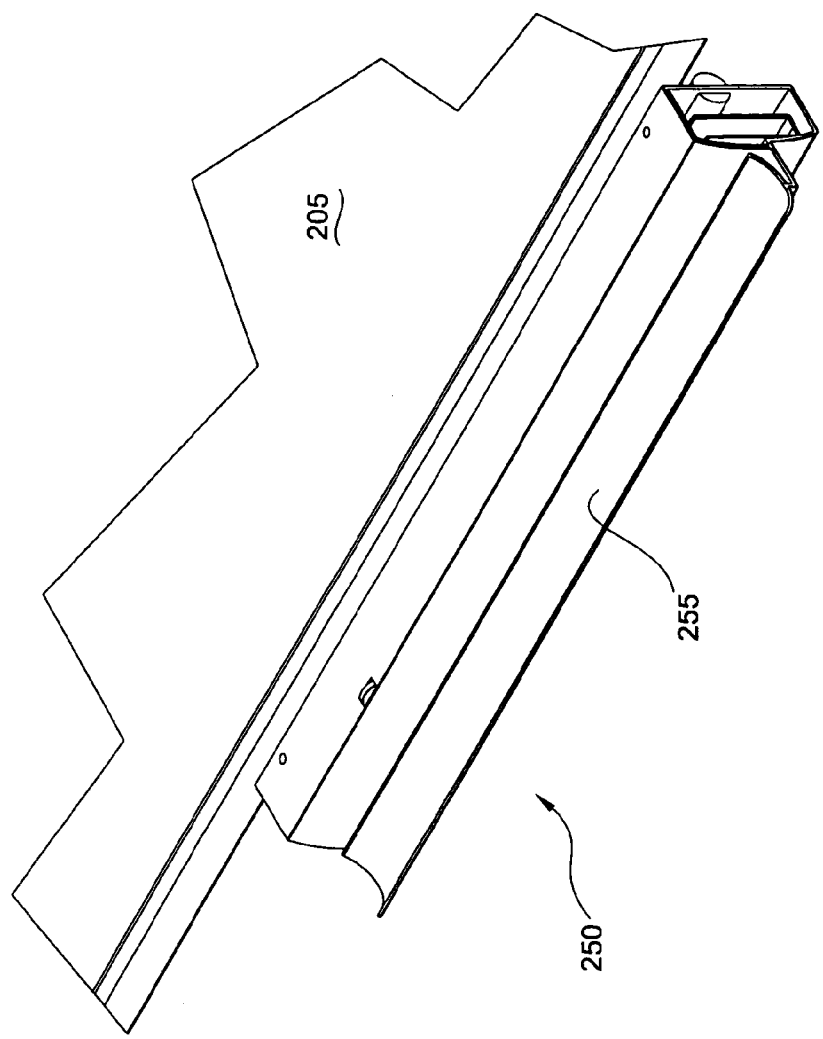
FIG. 8 illustrates a close-up perspective view of the assembled interactive tray system.
Figure 9A:
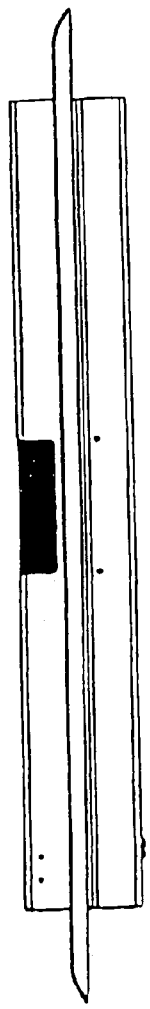
FIG. 9A illustrates a front view of the interactive tray system.
Figure 9B:
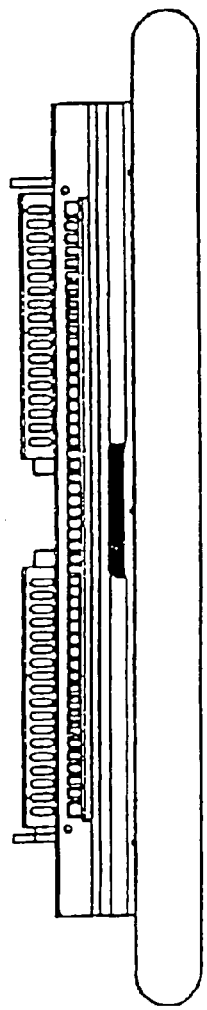
FIG. 9B illustrates a top view of the interactive tray system.
Figure 9C:
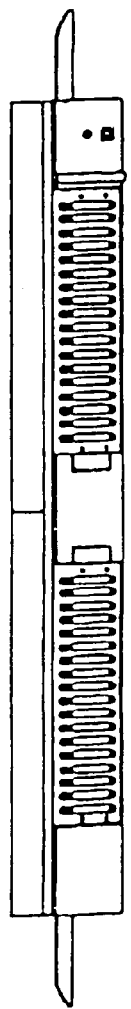
FIG. 9C illustrates a back view of the interactive tray system.
Figure 9D:
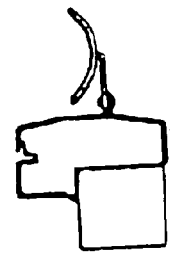
FIG. 9D illustrates a side view of the interactive tray system.

Preferably, the tray 250 can be fastened to the bottom of the presentation surface 205 by a clamping mechanism 275. FIG. 8 illustrates the tray 250 placed at the bottom of the non-interactive presentation surface. The tray 250 is attached to the bottom of the presentation surface 205 for aesthetic purposes, for some presentation surfaces contain speakers along the vertical sides of the presentation surface. Additionally, by placing the tray 250 at the bottom of the presentation surface 205, it has been found to have the best algorithm for triangulation sequencing. The tray system 250 can include a tray 255, which can hold a plurality of styli.

Figure 10:
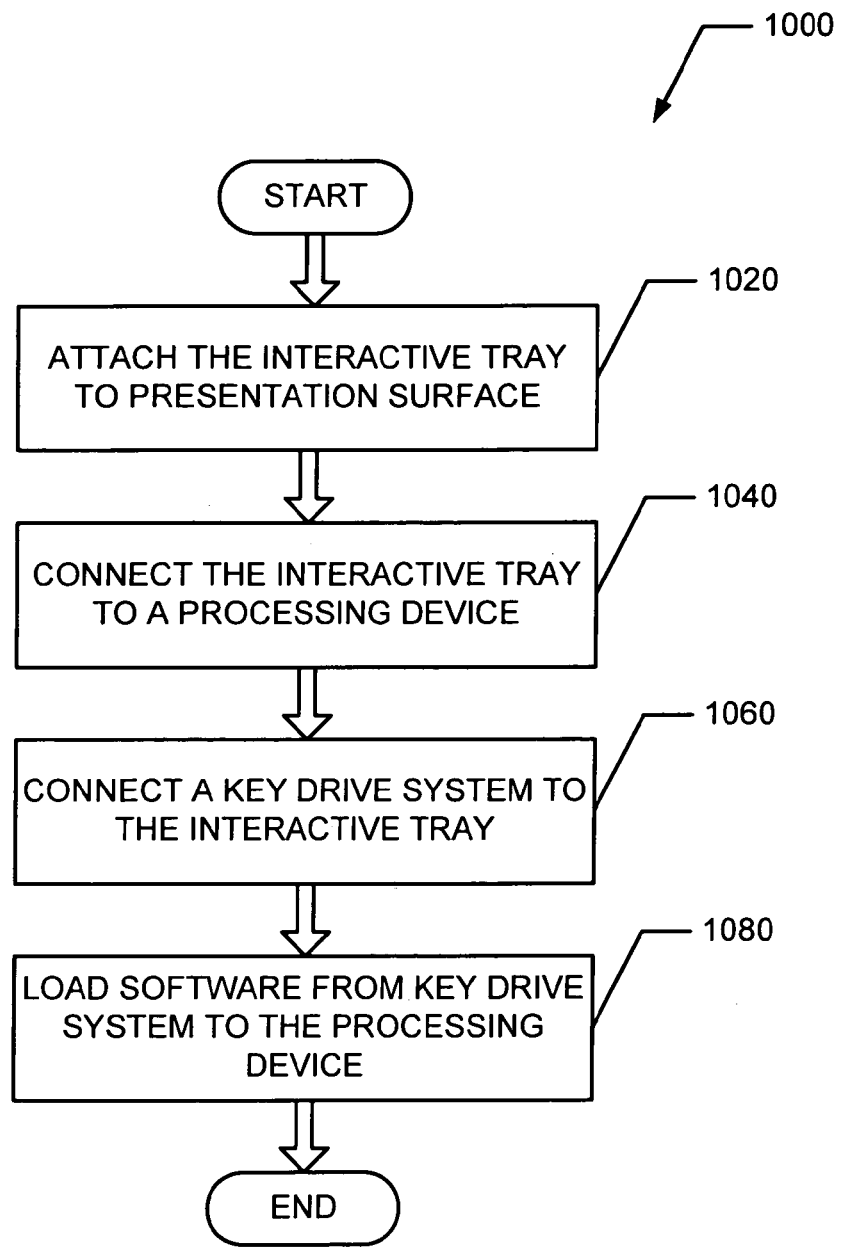
FIG. 10 depicts a logic flow chart of converting a presentation device into an interactive communication system.

FIG. 10 illustrates a method of connecting the interactive tray system 250. The method starts at step 1000. At 1020, the interactive tray 250 can be attached to the presentation surface 205. In a preferred embodiment, the interactive tray 250 is attached to a non-interactive presentation surface. At 1040, the interactive tray 250 is then connected to a processing device. This connection can be employed through a wired connection. Nevertheless, it will be understood that this communication is not limited to a metallic or fiber optic wired protocol. The linkages can be via a wireless connection by a wireless data protocol (e.g. Bluetooth, IEEE 802.11b communication, etc.). Furthermore, the connection can be made via a network. At 1060, the key drive system, described in more detail later, is connected to the interactive tray 250. Finally at 1060, software from the key drive system is loaded onto the processing device. The interactive tray system 250 is then ready for use.

A method of converting a non-interactive presentation surface into an interactive communication system 200 is also provided. The method includes sensing an instrument in proximity to the non-interactive presentation surface. The instrument can be the dry erase markers, non-marking stylus, a finger, and the like. Preferably, this sensing comes from the tray 250 located at the bottom of the presentation surface 205. Since the sensor system senses instruments near the presentation surface 205, the instrument can be in contact with the presentation surface 205 or simply in proximity.

The method can also include communicating with a computer the location of the instrument via location data. The instrument, when in proximity to the presentation surface, has a location. This location data can be communicated with the computer, or processing device.

The method can further comprise tracking the non-interactive presentation surface. Tracking syncs the location data with the computer. Other steps of converting the non-interactive presentation surface into the interactive communication system 200 include reducing interference by shielding the sensing of the instrument. This is typically handled by the shielding system 300.

The temperature of an element of the interactive communication system 200 can also be reduced. In this case, the reduction of temperature can be the presentation surface, say of a plasma or LCD screen, or the tray of the interactive communication system 200. Since the ventilation system 400 can include a fan, the fan can perform the reduction of temperature.

Electronic Presentation Messaging System

The present invention further comprises an interactive communication system including an e-mail system. The present e-mail system solves a problem of presentation portability. The present invention comprises an e-mail system that enables presentations and notes to be e-mailed to and from an interactive communication system.

The present invention comprises an electronic presentation messaging system that enables presentations and notes to be transmitted to and from an interactive communication system. As used herein, a "presentation" is defined as the work to be presented without annotation, and "notes" are defined as the annotation of the presentation. For example, a user might prepare and present a PowerPoint® series ("presentation"), and during the course of the series, attendees and the user might interactively annotate the series (with "notes").

Presentation Message to Interactive Communication System

The present electronic presentation messaging system, referred to herein as e-mail system, enables the presenter to create the presentation at one place, and e-mail it to the meeting room. Preferably, the presenter works at the desk, on a computer, putting the presentation together in comfort. The presenter would rather not have to carry a laptop everywhere, including the meeting room.

For example, an interactive communication system, or more specifically an electronic whiteboard, that has a built-in processor, which is connected to a network, so it can be modified to include the e-mail system, connected to a projecting device. Thus, the presenter can e-mail the presentation from a distant computer, to the electronic whiteboard, travel to the board, and simply push a button and review the e-mailed presentation and/or begin the presentation.

In one preferred embodiment, the present e-mail system is integrated into a third device, such as a room scheduling system. Alternatively, Outlook® or other exchange servers can be used. So, instead of using this web-based interface, the present e-mail system can be integrated with an e-mail program software.

Figure 11:
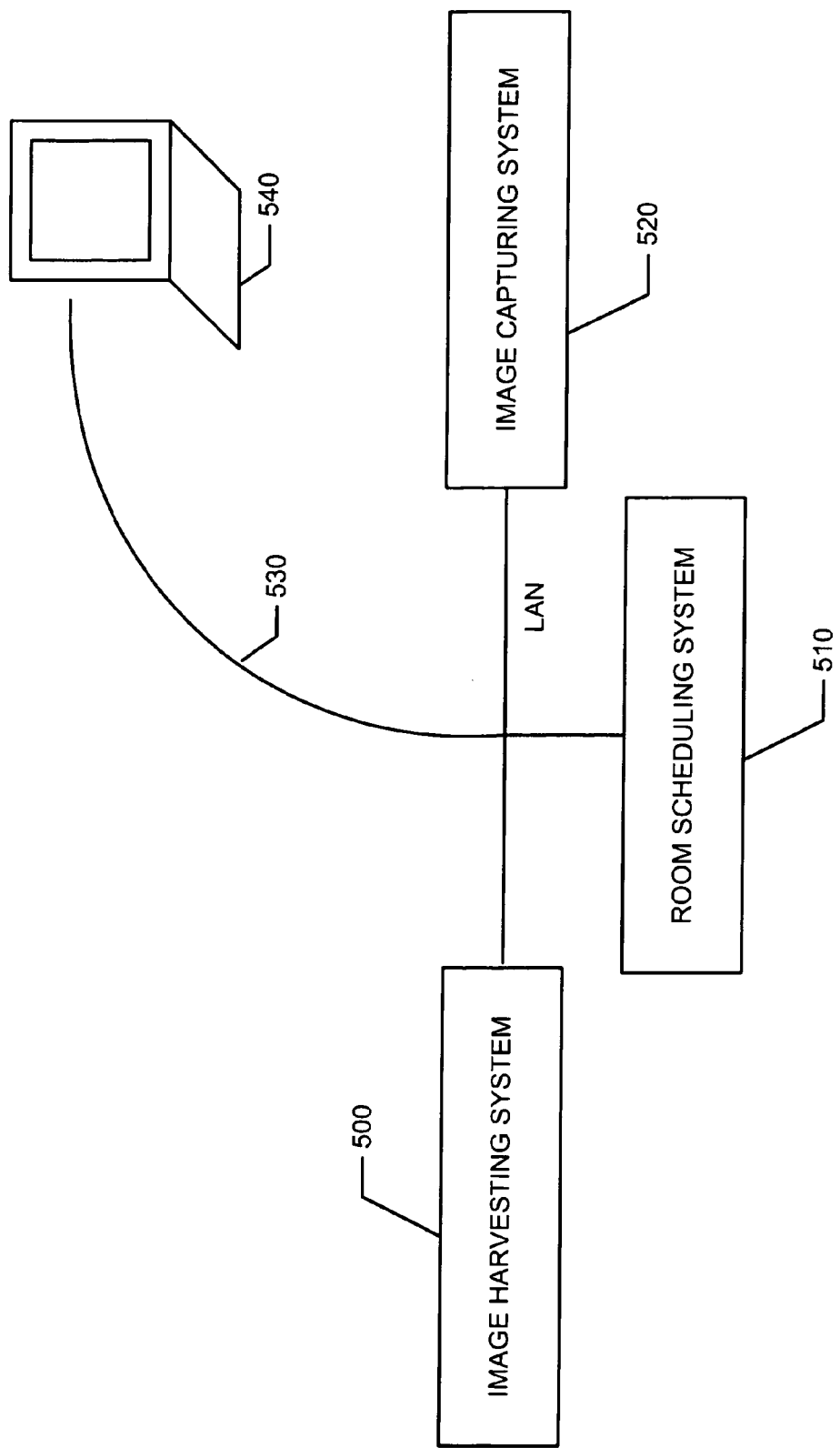
FIG. 11 depicts a system diagram of the electronic messaging presentation system.

FIG. 11 illustrates the integration of the present e-mail system with one or more of several components of an interactive communication system, including an image harvesting system 500, a room scheduling system 510, an image capturing system 520, the LAN 530 and the PC 540. The present e-mail system can be implemented by one of the components. For example, as shown in the figure, the scheduling system 510 both harvests the images and schedules the meetings. The interactive communication system incorporates an image capturing system, the e-mail system being capable of communicating directly with one or both of these components.

The scheduling system 510 includes an interactive display device that resides outside the door of a room, having a web server built into it and connected to the Ethernet. If one wants to schedule a meeting room, they can go to a web browser on a computer, and input in the name or address of the room, and thus schedules the room.

Using such a web-based system, the user can e-mail the presentation to the meeting room, and the presentation is picked up by the interactive communication system residing in the room. The scheduling system 510 not only can enable the e-mail system of the present invention, but it can integrate the invitation of attendees, and other scheduling functions, to truly automate the entire process.

Figure 12:
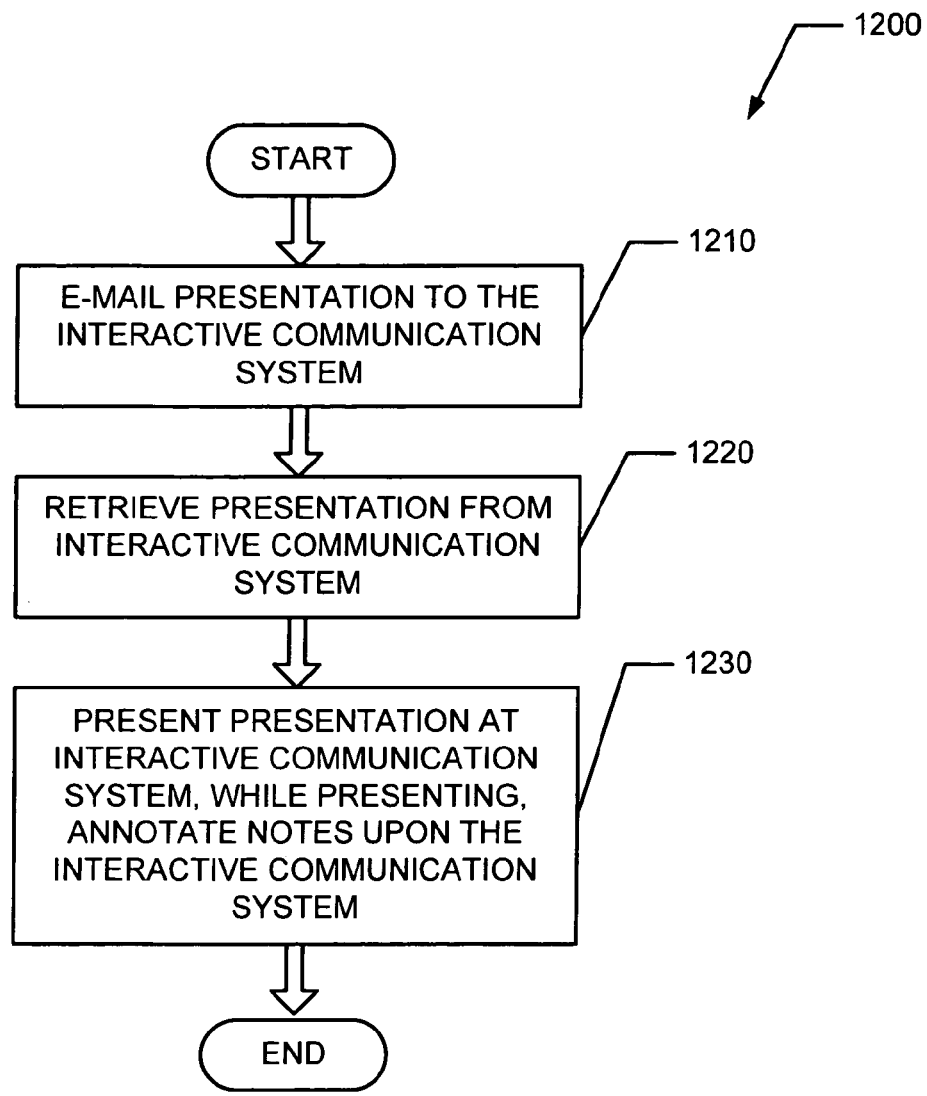
FIG. 12 depicts an embodiment of a logic flow diagram for transmitting a presentation to an interactive communication system.

In FIG. 12 an example of this technology is shown, wherein the user uses the scheduling system 510 to retrieve the e-mail address of the particular component of the interactive communication system (in the presentation meeting room) she is going to e-mail the presentation to. The process begins at 1200. At 1210, the user e-mails the presentation to the interactive communication system, typically, the whiteboard. Then at 1220, the presenter, who can be the user, receives the presentation at the interactive communication system. The scheduling system 510 uploads the presentation to the interactive communication system. Thus, at 1230, the presentation is ready for presenting. The presentation is given at the interactive communication system, while allowing notes to be annotated to the presentation.

Presentation Message from Interactive Communication System

The present e-mail system not only provides presentations to the interactive communication system in the meeting room, but also can send the presentation and notes from the device to attendees. One should be able to leave an interactive meeting and have the presentation/notes follow that person. He/she should not have to worry about toting a computer or memory device (e.g. diskettes or CD-ROM) everywhere. Currently, one has to either have a computer plugged in at the time of presentation download, assign the presentation to a printer, or save it to a web page; in any event, when the meeting is adjourned, the user will have to do something explicitly to archive the information. They might have to pull it down from a web page, scan in a sheet of paper, or organize it off of the computer—creating a large amount of setup time.

The present electronic presentation messaging system, or e-mail system, eliminates these problems. The attendee need not worry about archiving issues during a meeting. When the meeting is adjourned, the information follows the attendee through e-mail. The e-mail system can be coordinated through a web-based system, like the aforementioned scheduling system, which can track the number of attendees, and automatically send the presentation to each attendee via e-mail.

The system captures the notes and other interactive actions in real-time, or the presenter can manually select the type of information that should be archived while the presentation proceeds. Then, when the meeting is done, the system goes out and harvests the images off the interactive device, and at the end of the meeting, it automatically sends an e-mail to the attendees of the archived information of the meeting just completed. Alternately, each saved image can be e-mailed one at a time, or in other combinations of e-mails, as opposed to a single e-mail of the entire presentation at the end of the meeting. The e-mailed images can include many formats, including PDF files, JPEG files, PowerPoint® files, and the like. The notes can be combined with the presentation or remain in a separate file. The user can select which method the notes can be sent to the audience.

The e-mail system can alternatively send the presentation to a single administrator, who can then forward the presentation to the many attendees, should the scheduler not have the attendee information, or if no meeting was scheduled in the room, but the room used spontaneously.

Figure 13:
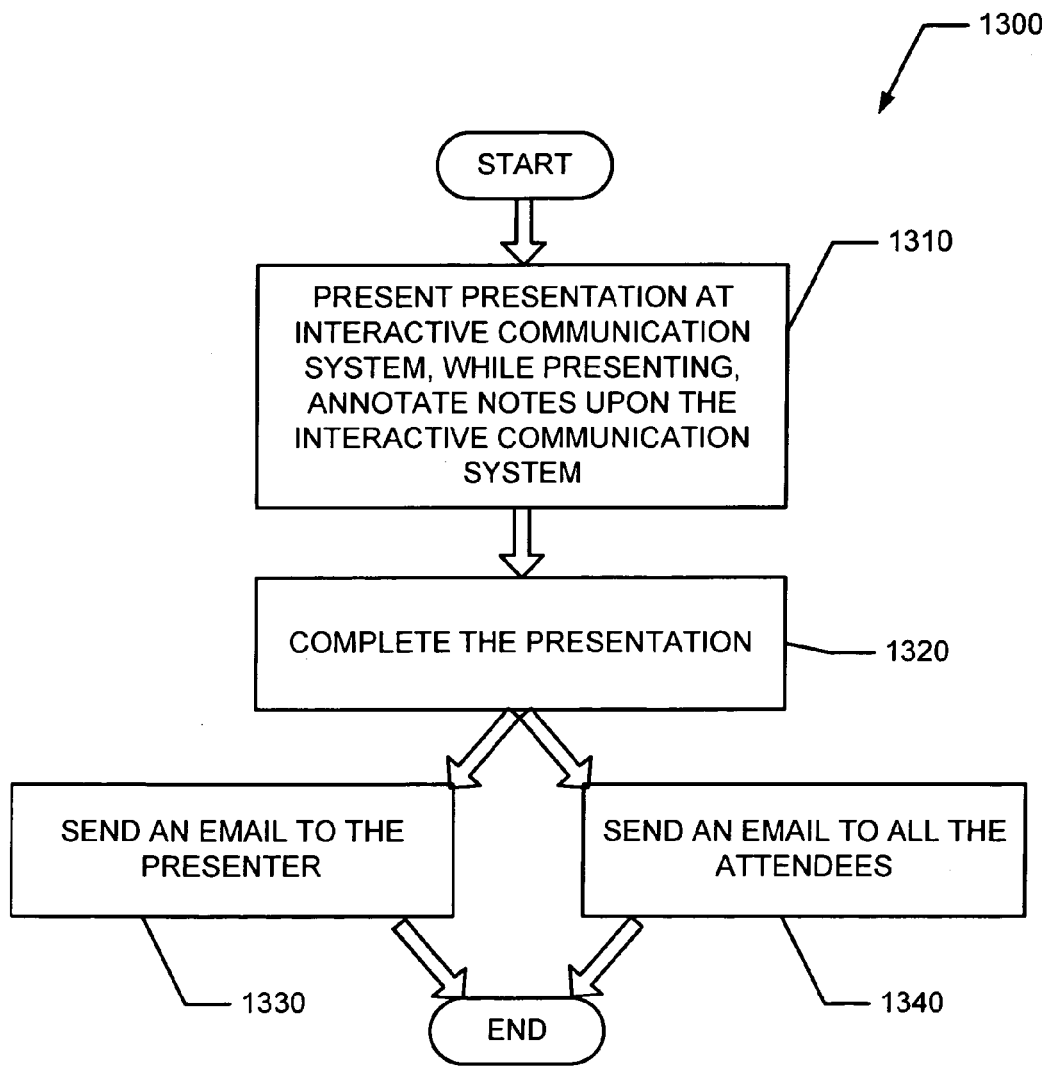
FIG. 13 depicts an embodiment of a logic flow diagram for transmitting a presentation with annotated notes from an interactive communication system.

In FIG. 13 an example of this technology is shown, wherein the user uses a scheduling system to schedule a meeting and the notes and other interactive actions are sent to the attendees. The process of sending an electronic mail from the interactive communication starts at 1300. The user schedules the conference room with the scheduling system, and the meeting commences. At discrete times during the presentation, or at the end, he saves the notes to the web/archive. At 1310, the scheduling system harvests the notes and the notes annotated to the presentation are saved. At 1320 the presentation ends. The presenter has two options in sending the electronic mail. The first, at 1330, is to have the e-mail automatically sent to herself. Alternately, at 1340, the e-mail can be sent to all attendees. The presenter can select either option at the beginning or end of the presentation.

Interactive Podium

Figure 14:
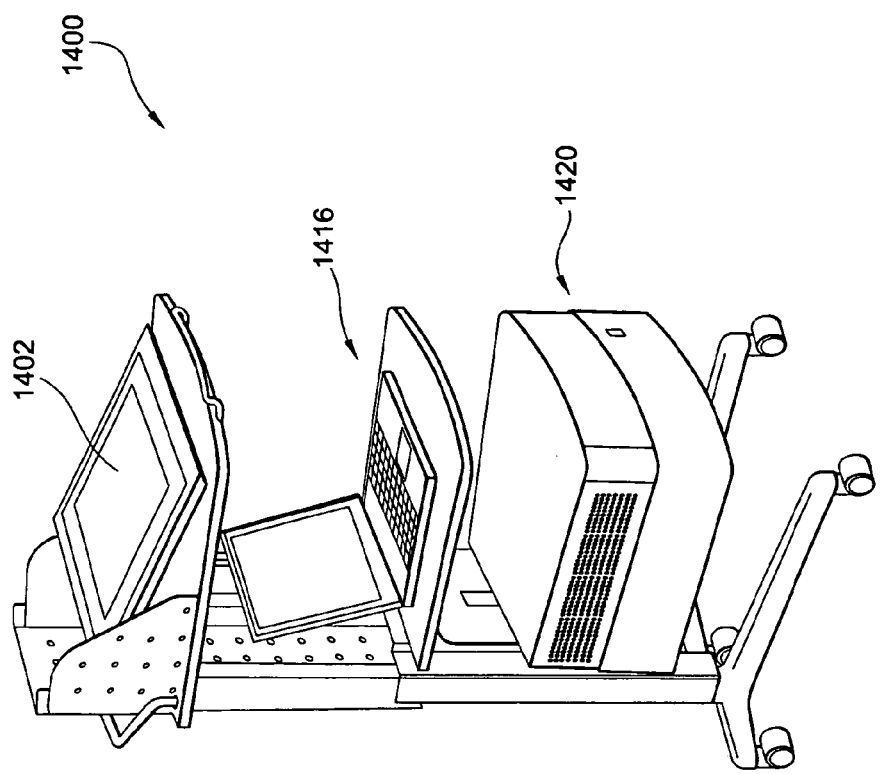
FIG. 14 depicts a perspective view of an interactive podium.

The present invention further comprises a mobility system for an interactive podium system 1400 as shown in FIG. 14, including a remote control system (not shown), and a mobile power system 1420.

The interactive podium system 1400 can be a touch screen 1402, typically a liquid crystal display (LCD) screen. The touch screen 1402 can be operated with a stylus (not shown). The podium 1400 can include a video input and a USB port to control a mouse. The processing device 1412 can run the presentation.

Mark-up tools are required to be used with the podium system, but currently such tools are provided as toolbars that can be observed by the attendees. The on-screen toolbars commonly get in the way of the presentation. Alternatively, some podium systems have placed the mark-up tools in hard buttons around the screen, wherein a toolbar does not hinder the presentation, but the user needs to be in proximity of the screen to push the buttons, and thus is not free to wander around the room.

Figure 15:
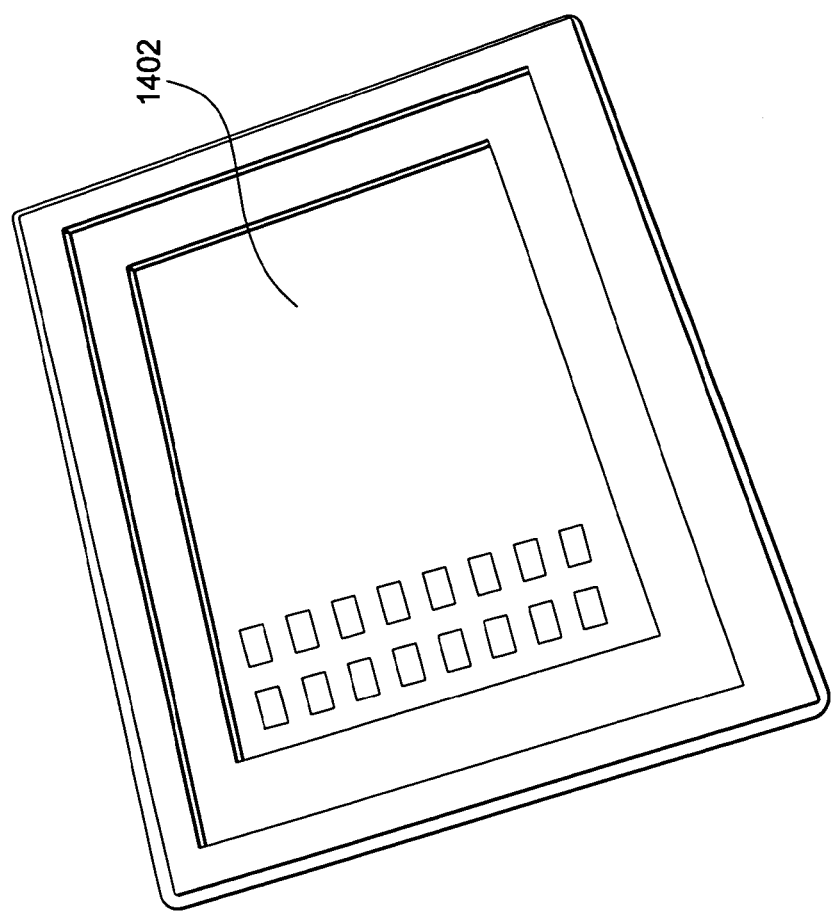
FIG. 15 illustrates a close-up view of a display screen embodiment comprises in the interactive podium.

The present invention enables one to be free of the display completely, all the while still capable of using mark-up tools and the like, by providing a remote control (not shown) with the system. Thus, for example, pen type and color can be selected away from the display. FIG. 15 depicts a close-up of an exemplary screen 1402 included in the interactive podium 1400.

The present invention includes the interactive podium system 1400, having an LCD display 1402 with pen-based input that can be used to point, click, and annotate a computer display which is also projected on a screen or interactive whiteboard. In addition, the interactive podium system 1400 is the only one of its kind to include a remote control (not shown), allowing the ability to walk about the room while presenting.

The interactive podium system 1400 can include preferably a 15-inch panel screen 1402, which is depicted in FIG. 15, includes associated components, like an electronic stylus, stylus tips, 110V (or 240V) power supply, rated 65 W or better, one AAA battery for the stylus, a six-foot universal serial bus (USB) cable, and a six-foot male-male video cable. Preferably, the screen 1402 is a LCD screen.

Figure 16:
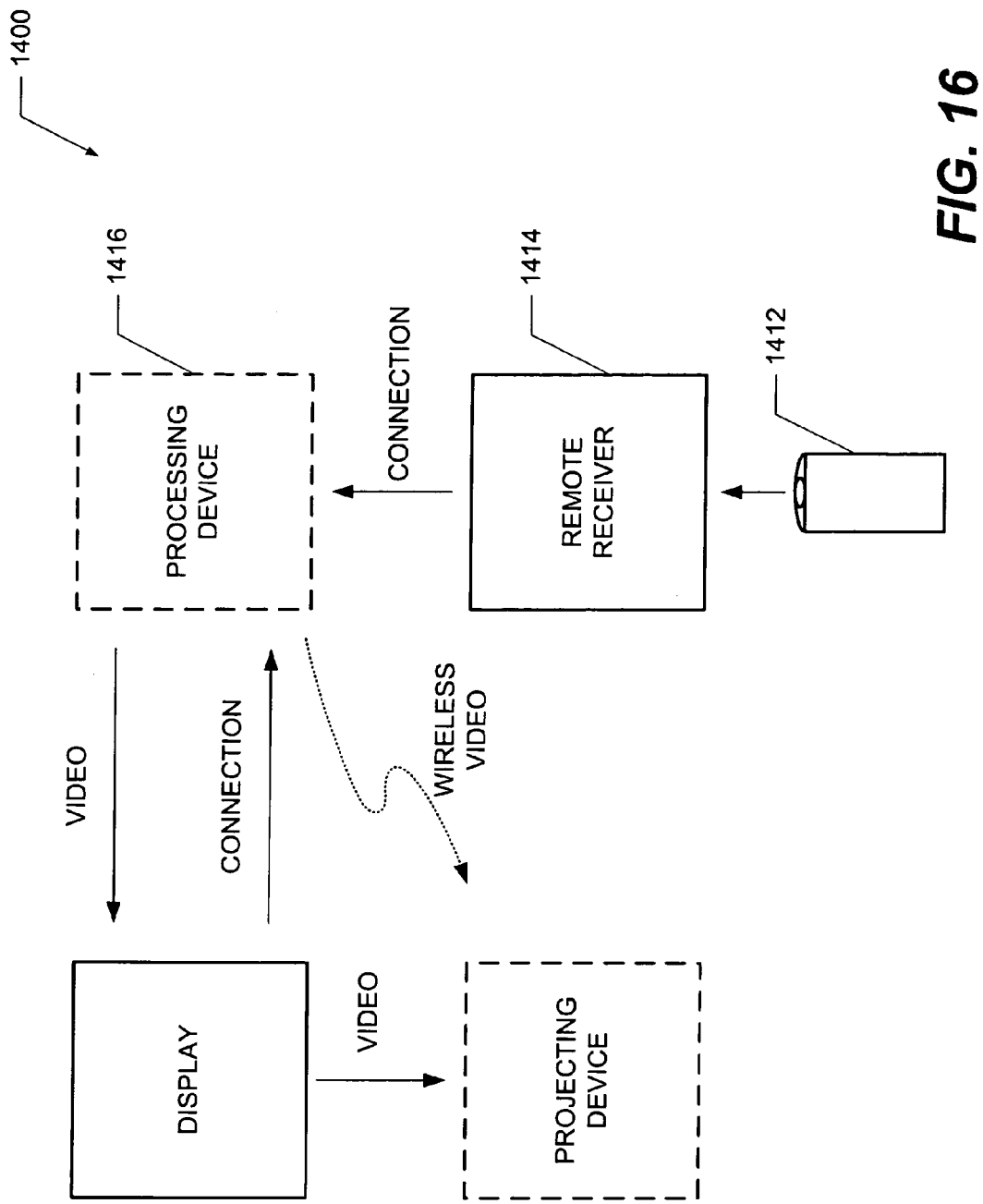
FIG. 16 illustrates a flow diagram of an embodiment of using a remote control in connection to the interactive podium.

FIG. 16 depicts an embodiment of the interactive podium system 1400 and the communication between a remote and the projected image. The interactive podium system 1400 preferably comprises an interactive LCD panel system, and the remote control system including a remote control 1412, and a remote control receiver 1414 in conjunction with a computer.

As depicted, the remote 1412 can sent a signal to the remote receiver 1414. The remote receiver 1414 receives the signal sent from the remote 1412. The remote receiver 1414 can be connected to the processing device, or computer 1416. The computer 1416 can send the image to be projected on the presentation surface. The connection communication between the processing computer 1416 and the presentation surface are depicted as hard-wire links, i.e. this connection can be employed through a wired connection. Nevertheless, it will be understood that this communication is not limited to a metallic or fiber optic wired protocol. The linkages can be via a wireless connection by a wireless data protocol (e.g. Bluetooth, IEEE 802.11b communication, etc.). Furthermore, the connection can be made via a network connecting the presentation surface with the computer 1416.

The remote control 1412 can be based on a touchpad remote control design with a custom top and keypads. The infrared signals of the remote control 1412 are received by the remote control receiver 1414. Preferably, up to three devices (whiteboards or podiums) may be used in one room. The remote 1412 can be configured to only control the software on one computer 1416 at a time by means of an A/B/C address slide switch on the side of the remote control 1412.

Figure 17:
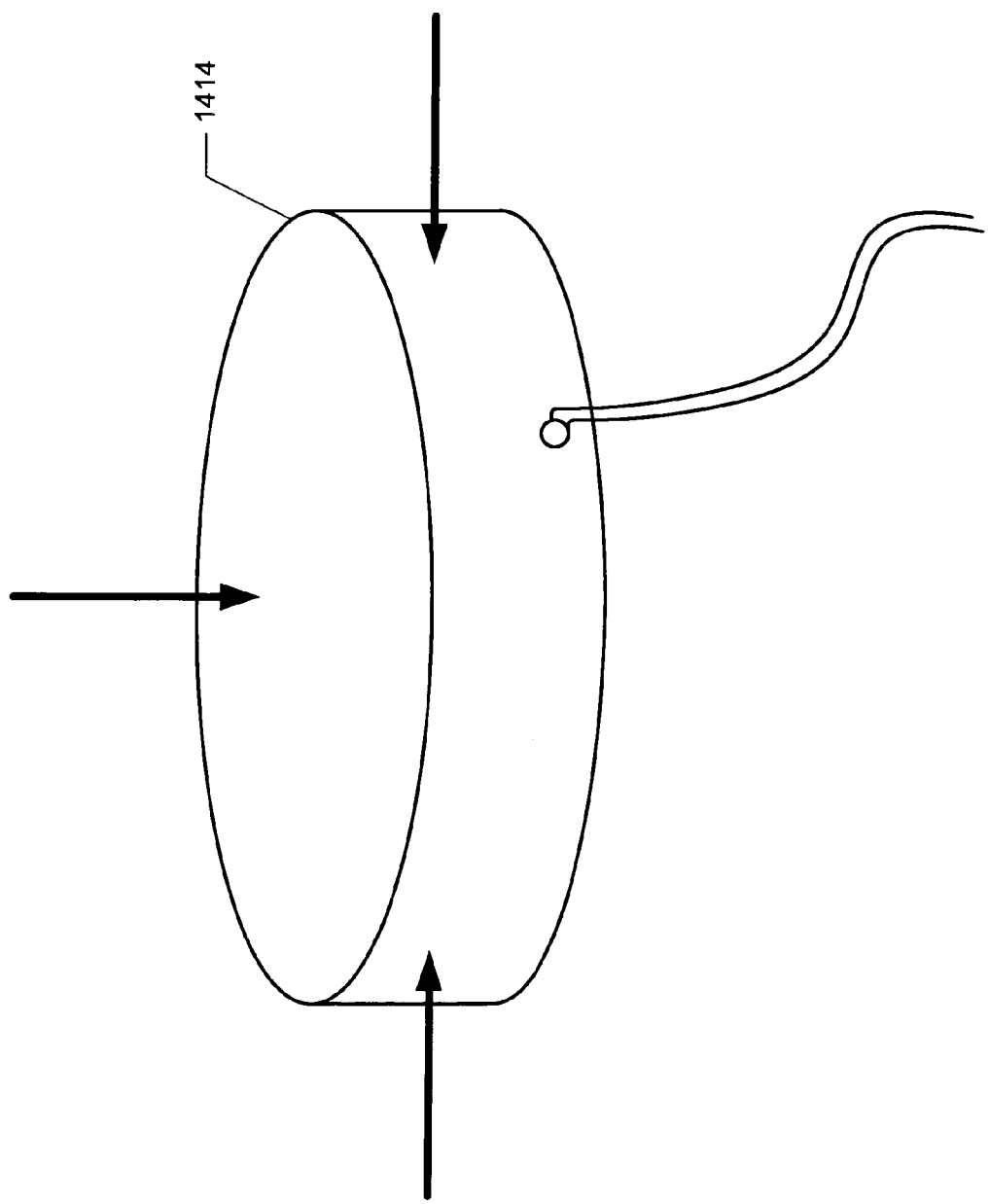
FIG. 17 depicts a remote receiver for the interactive podium.

FIG. 17 illustrates the remote control receiver 1414. The remote control receiver 1414 can be an infrared receiver in a puck-shaped device that can receive infrared signals from a remote control anywhere in the room (up to 40 feet), including from above. The receiver 1414 can have a hard-wired six-foot USB cord with a rectangular (type B) connector. The receiver 1414 has two key-hole slots in the rear to allow wall or table-top mounting.

The cable can exit the case either from the rear or the side; the location is user-configurable, allowing for either permanent mounting (e.g. on a wall) or temporary mounting (e.g. laying it on a desk). Preferably, the shape of the device is generally puck-like. Indeed, a design can be implemented wherein no visible indicators (LEDs) on the puck.

The disclosed remote controllable electronic podium system can enable a user to operate the electronic podium system 1400 from locations remote from or distal both the surface of the electronic podium and an attached computer terminal. Thus, the user has a greater range of mobility while maintaining the ability to operate the electronic podium system.

Using a remote control device 1412 in combination with input from the surface of the electronic podium 1400 or from an attached computer terminal to operate the disclosed electronic podium systems reduces the need for multiple menus or icons projected on the surface of the electronic podium. In some aspects of the present invention, a remote control device 1412 can be used to activate various control areas that can modify the function of the electronic podium system 1400. For example, the remote control device 1412 can be used to toggle between pen modes when a user is working with a projected image or physically writing or drawing on the electronic podium system 1400 directly. Alternatively, the remote control device 1412 can be used to save or print data written or projected on an electronic podium system 1400, or a combination of written and projected data.

One aspect of the present invention provides a remote control device 1412 for an electronic podium system 1400 having a body portion with a transmitting device for transmitting a signal to the electronic podium system 1400. The remote control device 1412 also can include at least one actuator that when selected, triggers the transmission of a signal to the electronic podium system 1400 for remotely controlling an operation of the electronic podium system 1400. The electronic podium system 1400 further can include a receiving device 1414 for receiving a signal from the remote control 1412. The receiving device 1414 can be in communication with the electronic podium system 1400, a component thereof, or a combination of components thereof, or attached to the computer 1416.

Another aspect of the present invention provides an electronic podium system 1400 having an electronic podium operatively connected to a processing device 1416, and a remote control device 1412 for transmitting a signal to the electronic podium 1400. The signal causes a set of instructions to be executed by the electronic podium system 1400. The system can also have the receiving device 1414 operatively connected to the electronic podium 1400 for receiving a signal from the remote control 1412. When the system executes the set of instructions, a function of the system is altered, initiated, terminated, modified or otherwise affected.

An exemplary method of operating electronic podium system 1400 includes receiving a signal from a remote control device 1412, and executing a set of instructions in response to receiving the signal, wherein the set of instructions alters a function of the electronic podium system 1400. Signals can also be received from the electronic podium surface or attached computer 1416. Thus, another aspect provides a method of operating an electronic podium system 1400 by receiving signals from a remote control device 1412 and the surface of an electronic podium or its associated computer device 1416.

Another exemplary method of operating remote controllable podium system 1400 includes the steps of receiving a signal from a remote control device 1416, and executing a set of instructions in response to receiving the signal, wherein the set of instructions alters an image displayed on a surface of the electronic podium 1400.

The system can incorporate remote control receivers 1414 having, for example, a USB connector on the end of it, and being placed around the meeting room, equipping an entire auditorium with receivers, providing a full range of mobility.

The Walk-and-Talk™ Presentation Series, made by PolyVision Corporation, for the whiteboard has been found to effectively remove the troubling on-screen toolbars, but the present mobile podium system 1400 is the first to implement non-on-screen toolbars with the podium via a remote control system 1410. This system is depicted in FIG. 14.

The present invention can further comprise a mobile power system 1420 for the podium system, to make the podium system 1400 even more mobile. The current interactive LCD screen 1402 podiums require cables for video and data and power, and in some cases a computer connection, and are fixedly attached to the floor, and/or attached by cables to a single place within the auditorium. The present invention in essence provides a battery and wheels to the interactive podium to allow mobility. In addition, a wireless link can be provided so that the computer need not reside on the podium. Alternatively, the computer is on the podium, but no wires are necessary to the projection (i.e., using 802.11b). The present podium is thus truly cordless.

Preferably, a battery unit provides 110 volts to drive both the laptop and the display. The computer can have wired video, but it also could use, for example, IEEE 802.11b, IEEE 802.11g, or Bluetooth, to transmit to a projector. The projector can also have wireless capability as well.

The present battery system can be used in other interactive communication systems beyond the podium units, including whiteboard systems, and can be used to drive numerous devices, including printers, wired or wireless, and the like.

Key Drive System

The present invention further comprises the integration of a key drive system into the connecting device, placing a hub between the key drive and the interactive device. This establishes the Y-shaped connector, and the switching of connections, and leaves a single cable, instead of two, and now with one cable plugged in, the software is one virtual device, and the interactive product is another virtual device, so that two devices install when plugged in.

This integrated key drive system concept can be used not just with interactive whiteboards, or flat panels, but can be used in all sorts of products from video games to television sets.

Loading software, or more specifically software drivers, is a complicated and often burdensome process. Usually, this process requires a significant amount of time to be completed properly. Unfortunately, the process also requires a host of software, e.g. diskettes or CD-ROMs. The typical method is to connect a device and to install the new software drivers on the computer to run the device.

When loading the drivers, which may include one or more diskettes, the order of inserting the diskettes is critical. Also, the manner of keeping the diskettes handy, should something happen to the hard drive running the software, is mandatory. Thus, what is needed is an easy and straight-forward method of loading software drivers, and software, without the need of diskettes.

Instant access is accomplished with a key storage drive. The key drive can be a universal serial bus (USB) disk-on-a-chip flash memory storage device, allowing instant plug-and-play. The key drive, which is attached to the USB cable, plugs into a computer to instantly connect the interactive communication system, eliminating the need for storing system software, say in a desk drawer. In essence, the key drive replaces the special application software (usually provided by CD-ROM) required in other interactive systems on the market. The typical interactive communication system runs on drivers, much like a printer, allowing anyone to instantly begin using the interactive communication system. By using the key drive technology, users can connect the interactive system to the computer immediately, eliminating the need to plan ahead.

The key drive can be physically attached to one end of a standard USB cable, forming a "Y" on one end. For example, to install interactive communication system software on the computer, one simply connects the key drive (on the USB cable) to the computer's USB port. When software installation is complete, the USB key drive is disconnected, and the straight USB cable is connected in it place.

Thus, it would be beneficial if a Y-connector technology can be replaced by effectively integrating one connector, and eliminating the need to change connectors from the to the USB connector, upon driver loading. Thus, alternatively, the technology can use a single cable having a memory device, wherein the electronics of the memory device can be locked out, resulting in a single cable system.

Figure 18:
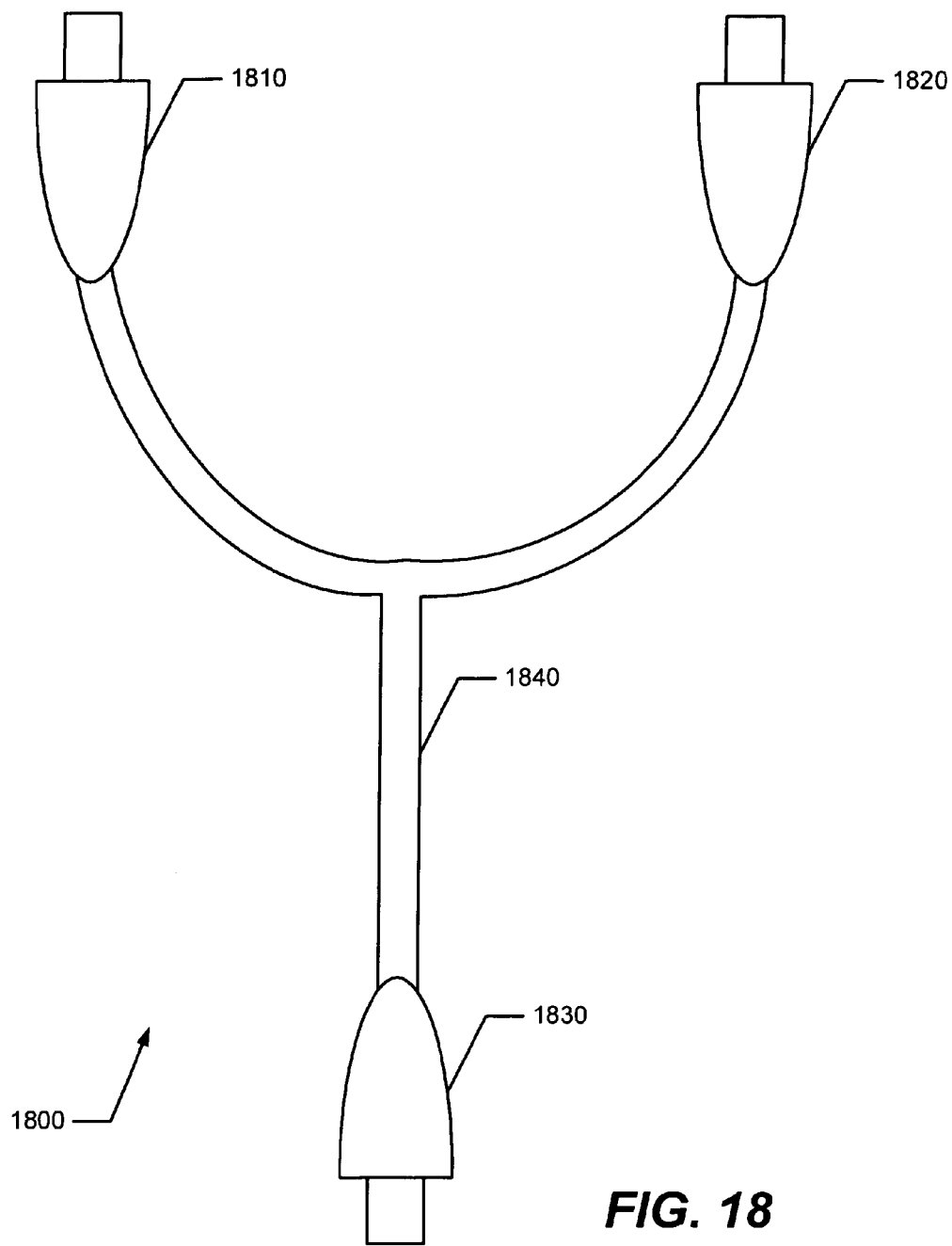
FIG. 18 depicts an embodiment of the key drive system.

The key drive system can be implemented in a Y-shaped connector cable. A preferred cable system 1800 is illustrated in FIG. 18, and shown as cable 1840. The leg connector 1830 is a connector that can be connected to an interactive communication system, for instance, an electronic whiteboard. Preferably, the connectors of the cable system 1800 can be a universal serial bus (USB) connector. The other end of the cable 1840 includes the Y-connections. The first connector 1810 can be connected to a computer; additionally, the connector 1810 can further contain a memory device. The connector 1820 can also be connected to a computer.

The Y-connector system, which has a first end having a first connector (the leg) and a second end having a pair of second connectors (or arms), present invention improves by having a memory device connected to one of the second connectors (one arm) on the second end of the Y-connector.

Figure 19:
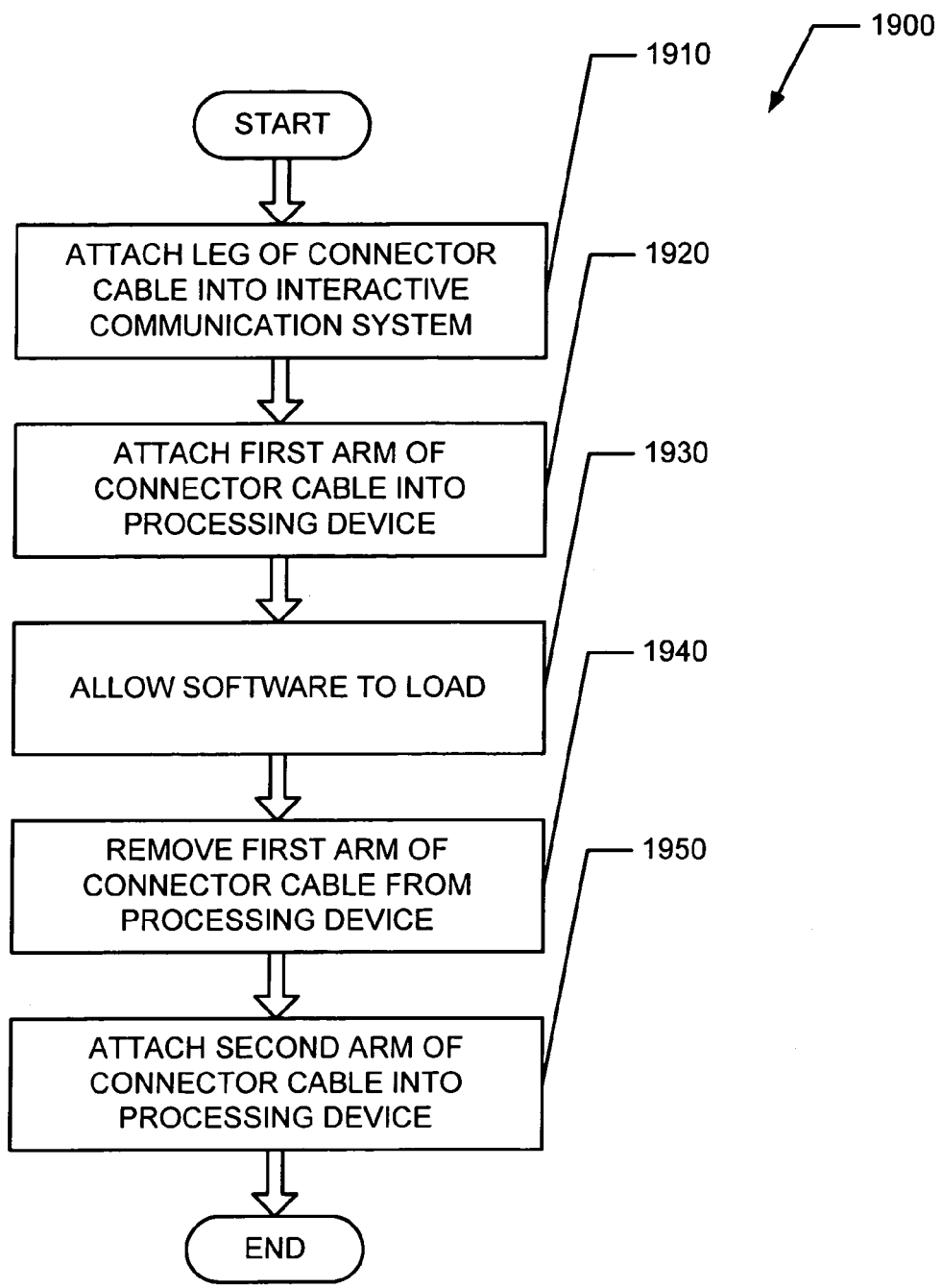
FIG. 19 illustrates a logic flow diagram of installing software drivers.

FIG. 19 illustrates a logic flow diagram of installing software drivers. The method 1900 is shown. At 1910, the connector 1830 of the leg of the connector 1840 is inserted in the interactive communication system 100. Then, at 1920, the first arm connector 1810 of the cable system 1800 is inserted into the processing device. The first arm connector 1810 can include a memory device. Upon inserting the connector 1810 into the processing device, step 1930 takes place, wherein the software or drivers are loaded onto the processing device. Upon completion of the software load, the first arm connector 1810 can be removed from the processing device, or step 1940. At 1950, the second arm connector 1820 of the cable system 1800 can then be inserted into the processing device. The process of installing software is then complete.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. An interactive communication system comprising:
   a first display board adapted to display a presentation;
   a notation capture system adapted to, during display of the presentation, sense an instrument in proximity to the first display board, the notation capture system determining one or more locations of the instrument relative to the first display board and interpreting the locations as notations to the presentation;
   a projector configured to project a digital representation of the notations onto the first display board; and
   a messaging system configured to:
      before display of the presentation, receive, at the messaging system, an incoming message comprising one or more electronic files embodying the presentation, wherein the incoming message is directed by a sender to the first display board; and
      after display of the presentation, transmit an outgoing message comprising the one or more electronic files along with the generated notations, the messaging system configured to transmit the one or more electronic files and generated notations automatically in response to determining display of the presentation has concluded.

2. The interactive communication system of claim 1, associated with a predetermined, static communications address to which the incoming message is sent by the sender.

3. The interactive communication system of claim 1, the messaging system integrated with the first display board, and the first display board associated with a predetermined, static communications address to which the incoming message is sent by the sender.

4. The interactive communication system of claim 1, the notation capture system comprising:
   the instrument, configured to transmit a signal indicative of the locations of the instrument with respect to the first display board; and
   a processing device in communication with the instrument, and configured to translate the locations of the instrument into operations performed on the first display board.

5. The interactive communication system of claim 1, further comprising an image capture system configured to capture one or more images of objects presented on the first display board, wherein the messaging system is configured to transmit the images.

6. The interactive communication system of claim 3, the static communications address being an email address, and the messaging system further configured to receive email messages directed to the display board.

7. The interactive communication system of claim 1, further comprising a scheduling system configured to receive a presentation request and to automatically reserve the first display board for the presentation based on the presentation request, the first display board being chosen from a plurality of display boards, the presentation request comprising:
   an electronic presentation; and
   a list of attendees associated with the presentation request;
   wherein the messaging system is configured to transmit the electronic presentation to the first display board automatically in response to selection of the first display board by the scheduling system.

8. The interactive communication system of claim 7, the messaging system being further configured to automatically transmit a plurality of digital notations of the presentation to the attendees associated with the presentation request at the conclusion of the presentation.

9. The interactive communication system of claim 7, the scheduling system further configured to invite the list of the attendees to attend the display of the presentation.

10. The interactive communication system of claim 1, the incoming message being an email message, the one or more electronic files being attachments to the email message.

11. An interactive communication system comprising:
a first display board adapted to display a presentation;
a notation capture system adapted to, during display of the presentation, sense an instrument in proximity to the first display board, the notation capture system determining one or more locations of the instrument relative to the first display board and interpreting the locations as notations to the presentation;
a projector configured to project a digital representation of the notations onto the first display board;
a messaging system configured to:
   before display of the presentation, receive, at the messaging system, an incoming message comprising one or more electronic files embodying the presentation, wherein the incoming message is directed by a sender to the first display board; and
   after ending display of the presentation, send an outgoing message comprising the one or more electronic files along with the generated notations; and
a scheduling system in communication with the messaging system and configured to receive scheduling information for the interactive communication system, wherein the messaging system transmits the one or more electronic files to a selected location for display of the presentation.

12. The interactive communication system of claim 11, the scheduling system configured to receive a list of one or more parties associated with the presentation, and the messaging system automatically transmitting the notations to each of the individual parties associated with the presentation.

13. The interactive communication system of claim 11, the scheduling system comprising a web server for receiving the scheduling information over the web.

* * * * *